United States Patent
Kawasaki

(10) Patent No.: US 9,900,874 B2
(45) Date of Patent: Feb. 20, 2018

(54) WIRELESS COMMUNICATION SYSTEM

(71) Applicant: FUJITSU LIMITED, Kawasaki-shi, Kanagawa (JP)

(72) Inventor: Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 495 days.

(21) Appl. No.: 14/486,526

(22) Filed: Sep. 15, 2014

(65) Prior Publication Data
US 2015/0003384 A1  Jan. 1, 2015

Related U.S. Application Data

(63) Continuation of application No. PCT/JP2012/001961, filed on Mar. 21, 2012.

(51) Int. Cl.
*H04W 72/04* (2009.01)
*H04L 5/00* (2006.01)
(Continued)

(52) U.S. Cl.
CPC ............ *H04W 72/042* (2013.01); *H04B 7/26* (2013.01); *H04B 7/2643* (2013.01);
(Continued)

(58) Field of Classification Search
None
See application file for complete search history.

(56) References Cited

U.S. PATENT DOCUMENTS 8,340,676 B2 * 12/2012 Nory ............... H04L 5/0053
370/208
2002/0196766 A1  12/2002 Hwang et al.
(Continued)

FOREIGN PATENT DOCUMENTS

CN         1159932 C    7/2004
KR   10-2011-0090783 A  8/2011
(Continued)

OTHER PUBLICATIONS

Nishio et al.,"Adaptive Transmission Techniques for Control Signaling in 3G-LTE", Panasonic Technical Journal, vol. 55, No. 1, pp. 15-20, Apr. 2009, URL: https://www.panasonic.com/jp/corporate/technology-design/ptj/pdf/v5501/0104.pdf, with English abstract.
(Continued)

*Primary Examiner* — Hicham Foud
(74) *Attorney, Agent, or Firm* — Myers Wolin, LLC

(57) ABSTRACT

In a wireless communication system, a first wireless station transmits region information to a second wireless station. The region information defines a partition between a first region and a second region. The first region appears earlier in time direction than the second region in a radio frame. Control information is mapped into each of the regions. The first region is employed for mapping the control information thereto according to a first condition wherein the control information and its associated data information are transmitted in a same radio frame. The second region is employed for mapping the control information thereto according to a second condition wherein the control information is transmitted in a radio frame preceding the radio frame that includes the data information associated with the control information.

12 Claims, 18 Drawing Sheets

(51) Int. Cl.
*H04W 52/24* (2009.01)
*H04B 7/26* (2006.01)
*H04L 1/00* (2006.01)
*H04W 48/12* (2009.01)
*H04L 27/34* (2006.01)

(52) U.S. Cl.
CPC .......... *H04L 5/0053* (2013.01); *H04L 5/0073* (2013.01); *H04L 5/0078* (2013.01); *H04W 52/243* (2013.01); *H04W 52/244* (2013.01); *H04L 5/0032* (2013.01); *H04L 5/0035* (2013.01); *H04L 5/0082* (2013.01); *H04L 5/0087* (2013.01); *H04L 5/0094* (2013.01); *H04L 27/34* (2013.01); *H04L 2001/0092* (2013.01); *H04W 48/12* (2013.01); *Y02B 60/50* (2013.01)

(56) References Cited

U.S. PATENT DOCUMENTS

| | | | |
|---|---|---|---|
| 2006/0274754 A1* | 12/2006 | Cho | H04L 49/351 370/392 |
| 2008/0096569 A1* | 4/2008 | Khandekar | H04W 36/18 455/442 |
| 2011/0261712 A1* | 10/2011 | Park | H04W 36/0072 370/252 |
| 2011/0274064 A1 | 11/2011 | Luo et al. | |
| 2011/0299489 A1* | 12/2011 | Kim | H04L 1/0046 370/329 |
| 2012/0275393 A1* | 11/2012 | Sorrentino | H04L 5/0094 370/329 |
| 2012/0300741 A1 | 11/2012 | Han et al. | |
| 2013/0156011 A1 | 6/2013 | Suzuki et al. | |
| 2014/0013191 A1* | 1/2014 | Gong | H03M 13/09 714/794 |
| 2015/0003384 A1 | 1/2015 | Kawasaki | |

FOREIGN PATENT DOCUMENTS

| | | |
|---|---|---|
| WO | 2011/085192 A1 | 7/2011 |
| WO | 2011/137383 A1 | 11/2011 |
| WO | 2012/005145 A1 | 1/2012 |
| WO | 2013/140448 A1 | 9/2013 |

OTHER PUBLICATIONS

Notification of Reasons for Refusal issued for corresponding Japanese Patent Application No. 2014-505800 dispatched on Oct. 27, 2015 with a partial translation.

Notice of Preliminary Rejection issued by the Korean Intellectual Property Office for corresponding Korean Patent Application No. 10-2016-7021025, dated Sep. 5, 2016, with English translation.

Extended European search report with a supplemental European search report and the European search opinion issued for corresponding European Patent Application No. 12872182.6 dated Jun. 2, 2015.

HTC, "E-PDCCH Design Considerations on Multiplexing with PDSCH", Agenda Item: 7.6.2, 3GPP TSG-RAN WG1 #68, R1-120266, 3rd Generation Partnership Project (3GPP), Dresden, Germany, Feb. 6-10, 2012.

LG Electronics, "Discussion on DL Assignment Placement", Agenda Item: 7.6.2, 3GPP TSG RAN WG1 Meeting #68, R1-120448, 3rd Generation Partnership Project (3GPP), Dresden, Germany, Feb. 6-10, 2012.

Partial supplementary European search report issued for corresponding European Patent Application No. 12872182.6 dated Feb. 4, 2015.

3GPP TS36.211 V10 4.0; Technical Specification; "3rd Generation Partnership Project; Technical Specification Group Radio Access Network; Evolved Universal Terrestrial Radio Access (E-UTRA); Physical Channels and Modulation (Release 10)"; (Dec. 2011).

Nokia; "Motivations and scenarios for ePDCCH"; Agenda Item: 7.5.5.2; 3GPP TSG RAN WG1 Meeting #66bis; R1-113155 ; Zhuhai, China; Oct. 10-14, 2011.

ZTE; "Discussion on multiplexing of different DCI messages"; Agenda Item: 7.7.4; 3GPP TSG RAN WG1 Meeting #67; R1-113751; San Francisco, USA; Nov. 14-18, 2011.

Samsung; "Resource multiplexing of E-PDCCH"; Agenda Item: 7.7.2; 3GPP TSG RAN WG1 #67; R1-114241; San Francisco, USA; Nov. 14-18, 2011.

International Search Report for corresponding PCT Application No. PCT/JP2012/001961, dated Jun. 5, 2012.

HTC; "E-PDCCH Design Considerations on Multiplexing with PDSCH"; Agenda Item: 7.7.2; 3GPP TSG-RAN WG1 #67; R1-114354; San Francisco, USA; Nov. 14-18, 2011.

Notice of Preliminary Rejection issued for corresponding Korean Patent Application No. 10-2014-7026083 dated Aug. 17, 2015 with an English translation.

First Notification of Office Action issued by the State Intellectual Property Office of China for corresponding Chinese Patent Application No. 201280071555.4, dated Jun. 19, 2017, with an English translation.

Notification of Reasons for Refusal issued by the Japan Patent Office for corresponding Japanese Patent Application No. 2016-088604, dated Jun. 13, 2017, with an English translation.

Notification of Reasons for Refusal issued by the Japan Patent Office for corresponding Japanese Patent Application No. 2016-088604, dated Mar. 14, 2017, with an English translation.

ZTE, "Consideration on enhanced PDCCH structure", Agenda Item: 7.6.2, 3GPP TSG-RAN WG1 Meeting #68, R1-120313, Dresden, Germany, Feb. 6-10, 2012.

Fujitsu, "Cross-subframe scheduling by E-PDCCH", Agenda Item: 7.6.5, 3GPP TSG-RAN WG1 Meeting #68, R1-120759, Dresden, Germany, Feb. 6-10, 2012.

Fujitsu, "Cross-subframe scheduling by ePDDCH for large PDSCH size", Agenda Item: 7.6.4, 3GPP TSG-RAN WG1 Meeting #68bis, R1-121200, Jeju, Korea, Mar. 26-30, 2012.

Notice of Final Rejection issued by the Korean Intellectual Property Office for corresponding Korean Patent Application No. 10-2016-7021025, dated Jul. 3, 2017, with English translation.

Decision of Refusal issued by the Japan Patent Office for corresponding Japanese Patent Application No. 2016-088604, dated Aug. 22, 2017, with an English translation.

Second Notification of Office Action issued by the State Intellectual Property Office of China for corresponding Chinese Patent Application No. 201280071555.4, dated Nov. 30, 2017, with an English translation.

* cited by examiner

FIG. 8

| RB ALLOCATION | MCS | RV·NDI | HARQ PROCESSING NUMBER | PUCCH POWER CONTROL | RNTI |

FIG. 16

| RB ALLOCATION | MCS | RV·NDI | HARQ PROCESSING NUMBER | PUCCH POWER CONTROL | RNTI | CONTROL OBJECT FRAME |

WIRELESS COMMUNICATION SYSTEM

CROSS-REFERENCE TO RELATED APPLICATION

This application is a continuation application of International Application PCT/JP2012/001961 filed on Mar. 21, 2012, the entire contents of which are incorporated herein by reference.

FIELD

The present invention relates to a wireless communication system, a wireless station, and a wireless communication method.

BACKGROUND

In recent years, wireless communication technologies for the next generation of wireless communication systems such as a cellular system have been discussed and studied in order to improve further their performance (e.g. data rate, latency in data transmission) and increase capacity of data and mobile station. For example, the 3rd Generation Partnership Project (3GPP), a standards body, has developed wireless communication system standards called LTE and its enhanced version called LTE-Advanced (LTE-A).

As of the time when the present invention described in this document is created, the latest version of LTE is Release 10 (referred to as LTE-A), and 3GPP is developing its enhanced version, Release 11. Hereinafter, unless otherwise noted, it is assumed that "LTE" includes LTE-A and its further enhanced versions, in addition to LTE.

Various technologies have been discussed as candidate technologies for LTE release-11. During the discussion, many technical issues have been identified, one of which is addressed by the present invention. The invention provides a solution to a difficulty in scheduling of large-size data when the data and a control signal used for the scheduling of the data are frequency-division multiplexed in the same DL subframe. In the following description, a radio link in a direction from a wireless terminal to a wireless base station is referred to as UpLink (UL), and a radio link in a direction from the wireless base station to the wireless terminal is referred to as DownLink (DL).

First, FIG. 1 illustrates a format of LTE Release-8 DL subframe 1. Basically, transmission of a data signal to a wireless terminal is performed in units of subframes in a time region. The radio link of DL is formed on an Orthogonal Frequency Division Multiplexing (OFDM) signal. In FIG. 1 and the following respective drawings, a horizontal direction (rightward) represents a frequency axis and a vertical direction (downward) represents a time axis. The DL subframe 1 is divided into two slots (a first slot 11 and a second slot 12) in a time axis direction. For example, the length of the DL subframe 1 is 1 ms, and the length of one slot is 0.5 ms.

DL subframe 1 is divided into two regions: a control signal region 13 composed of n consecutive OFDM symbols ($n=\{1, 2, 3\}$) starting from the first OFDM symbol of the subframe in the time axis direction and a data signal region 14 following the control signal region 13. The control signal region 13 is a region in which a DL control signal 15 corresponding to a Physical Downlink Control CHannel (PDCCH) is arranged. In FIG. 1, two DL control signals 15a and 15b are arranged in the control signal region 13 as an example. In contrast, the data signal region 14 is a region in which a DL data signal 16 corresponding to a Physical Downlink Shared CHannel (PDSCH) is arranged. In FIG. 1, two DL data signals 16a and 16b are arranged in the data signal region 14 as an example. For simplicity, in this document, signals which are simply referred to as control signals indicate DL control signals, and signals which are simply referred to as data signals indicate DL data signals.

The DL control signal 15 is arranged in the control signal region 13 according to a predetermined rule. Further, the DL data signal 16 is arranged to occupy a frequency region (frequency width) within the data signal region 14. The DL data signal 16 occupies a certain frequency region within the subframe, without being divided into a plurality of pieces in the time axis direction within the subframe.

The DL data signal 16 within the data signal region 14 is linked to the DL control signal 15a within the control signal region 13. Specifically, Resource Block Allocation (RB allocation), which is a parameter included in Downlink Control Information (DCI), indicates the location of the frequency region in a subframe occupied by the data signal 16 (radio resource occupied by the data signal 16). The DCI is converted into the DL control signal 15 by being coded and modulated, and the DL control signal 15 is arranged (mapped) in the control signal region 13 so as to form PDCCH. The wireless terminal that has received the DL subframe 1 detects whether there is a PDCCH (DCI) addressed to the wireless terminal in the control signal region 13 of the DL subframe 1, and if there is a PDCCH (DCI) for the wireless terminal in the DL subframe, the wireless terminal extracts arrangement information of the DL data signal 16, based on a value of RB allocation included in the detected PDCCH addressed to the wireless terminal. In FIG. 1, as an example, the DL control signal 15a is linked to the DL data signal 16a, and the DL control signal 15b is linked to the DL data signal 16b.

In the latest LTE specification, the control signal region 13 is composed of at most 3 consecutive OFDM symbols. If the time-domain size of the control signal region 13 is increased to more than three symbols, it is difficult to maintain its compatibility with operations of wireless terminals designed based on earlier releases of LTE specifications.), and thus changing the restriction of a maximum of three symbols is not practical. However, due to the restriction, the control signal region 13 in a subframe can become insufficient in size to accommodate many control signals in the subframe when data to many wireless terminals are scheduled in the subframe. Further, when a large number of wireless terminals are located near cell boundaries, the control signal region 13 can become insufficient in size. This is because DL control signal 15 for such a wireless terminal near cell boundaries is usually applied a very low coding rate and can become large in size over the air. Therefore, the control signal region cannot accommodate many control signals for cell-boundary wireless terminals in a subframe.

Similarly, in Coordinated Multiple Point (CoMP) transmission and reception, which has been actively discussed in Release 11 of 3GPP, the restriction of the size of the control signal region 13 can lead to a problem, too. In CoMP, a plurality of wireless base stations cooperatively and simultaneously perform data transmission to and data reception from a particular wireless terminal(s). For example, when the wireless terminal is located near cell boundaries, it is possible to improve characteristics of data transmission to the wireless terminal by applying CoMP transmission to data to the wireless terminal. However, when a large number of wireless terminals near cell boundaries are applied CoMP transmission to data to the terminals, the control signal region 13 can become insufficient in size as described above. Therefore, it can be difficult to apply CoMP to all wireless terminals which are intended to be applied CoMP transmission in the same DL subframe 1. Further, in a case of Multi User MIMO (MU-MIMO) transmission in which the same frequency region in the data signal region is used for data transmission to a plurality of wireless terminal, more resource in the control signal region is used. When MU-MIMO transmission is applied to data transmission to many wireless terminals in the same subframe, the control signal region 13 can become insufficient in size. Not all the wireless terminals will be applied MU-MIMO transmission.

Thus, in Release 11 of 3GPP, to address the aforementioned problem, a new DL subframe 1 is proposed. FIG. 2 illustrates a format of the new DL subframe 1.

In the DL subframe 1 of FIG. 2, it is possible to configure a control signal region different from the existing control signal region 13, in the existing data signal region 14. The different control signal region is called an enhanced control signal region 17. It is possible to arrange an enhanced DL control signal 18 corresponding to an Enhanced-Physical Downlink Control CHannel (E-PDCCH) in the enhanced control signal region 17.

The enhanced control signal region 17 may be used similarly to the existing control signal region 13. Further, the enhanced DL control signal 18 may include DCI similarly to the existing DL control signal 15. Therefore, similarly to the normal DL control signal 15, the enhanced DL control signal 18 may be linked to the data signal. In FIG. 2, as an example, the enhanced DL control signal 18 is linked to the DL data signal 16a, and the DL control signal 15 is linked to the DL data signal 16b. It is possible to semi-statically change the size of a region capable of storing the DL control signal(s) (enhanced DL control signal 18) for each wireless terminal configured to use the enhanced control signal region.

Non Patent Literature 3GPP TS36.211 V10.4.0 (2011-12), and 3GPP R1-113155 "Motivations and scenarios for ePDCCH" (2011-10) are examples of the related art.

SUMMARY

According to an aspect of the invention, a wireless communication system in which a first wireless station transmits a radio signal including a plurality of radio frames sequentially to a second wireless station, at least one of the plurality of radio frames including data information and control information, a beginning of the data information being prior to an end of the control information within the at least one of the plurality of radio frames, the control information including information for coding the data information, the wireless communication system includes the first wireless station configured to transmit the radio signal including a radio frame that includes region information to the second wireless station, the region information defining a partition between a first region and a second region, the first region appearing earlier in time direction than the second region in the at least one of the plurality of radio frames, the first region within which the control information is mapped when the control information and the data information corresponding to the control information are transmitted in a one radio frame, the second region in which the control information is mapped when the control information is transmitted in a radio frame prior to a subsequent radio frame that includes the data information corresponding to the control information, to encode the data information corresponding to the control information in accordance with the control information, and to transmit the radio signal to the second wireless station, the radio signal including a radio frame that includes the control information and the encoded data information corresponding to the control information when mapping the control information within the first region, the radio signal including a radio frame that includes the control information prior to a subsequent radio frame that includes the encoded data information corresponding to the control information when mapping the control information in the second region, and the second wireless station configured to receive the radio signal including a radio frame that includes the region information from the first wireless station, to receive the radio signal including a radio frame that includes the control information from the first wireless station, to determine the received control information is mapped whether within the first region or in the second region based on the received region information, and to decode the encoded data information received from the first wireless station in accordance with the received control information, the encoded data information obtained from the received radio frame that includes the received control information when the received control information is mapped within the first region, the encoded data information obtained from a subsequent radio frame of the received radio frame that includes the received control information when the received control information is mapped in the second region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a DL control signal and an enhanced DL control signal of the first embodiment.

FIG. 16 is a diagram illustrating an example of a DL control signal and an enhanced DL control signal of a fifth embodiment.

DESCRIPTION OF EMBODIMENTS

Figure 1:
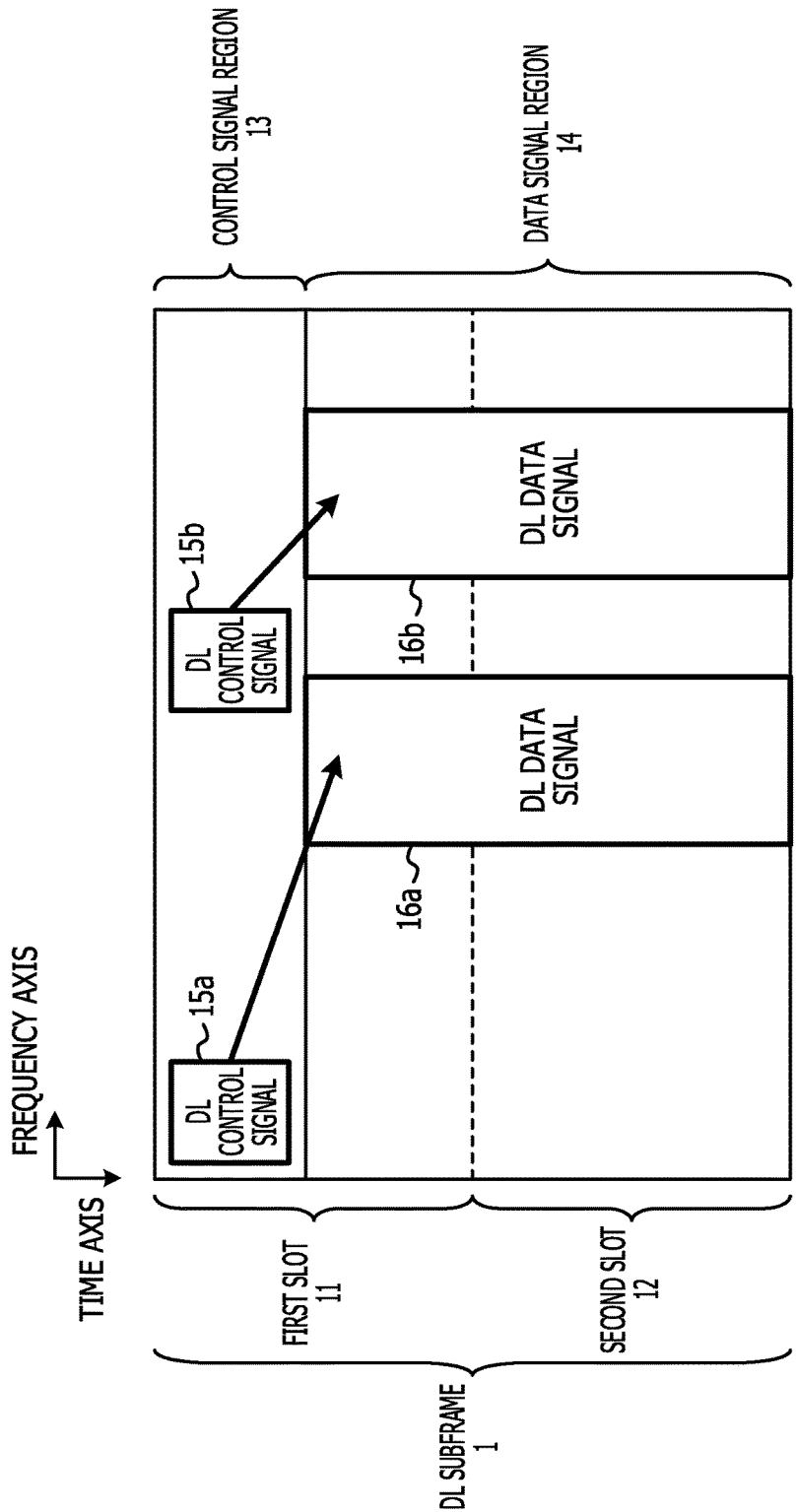
FIG. 1 is a diagram illustrating an example of a configuration of a DL subframe in Release 10 of 3GPP.
Figure 2:
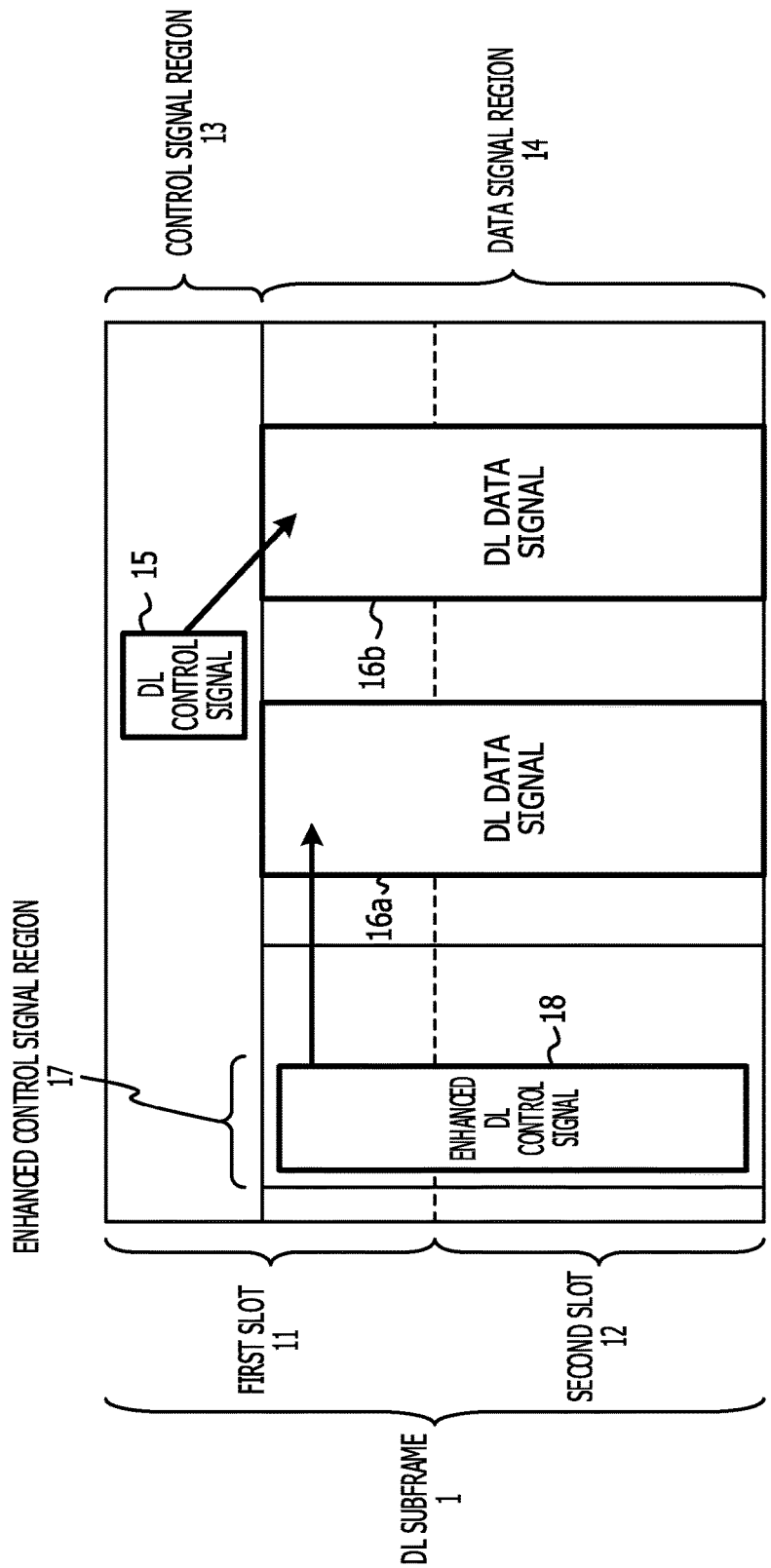
FIG. 2 is a diagram illustrating an example of a configuration of a DL subframe in Release 11 of 3GPP.

According to the DL subframe 1 of FIG. 2 described above, it is possible to solve the problem of the size of the control signal region 13 being insufficient. However, the DL subframe 1 of FIG. 2 is not necessarily a scheme that is proposed with consideration of whether the transmission and reception of the DL data signal 16 is performed properly. As a result of repeating detailed studies from this point of view, the inventors found that if the enhanced control signal region 17 is used in the DL subframe 1 of FIG. 2, the transmission and reception of the DL data signal 16 is not properly performed in some cases.

The technology of the disclosure has been made in view of the above problem, and an object is to provide a wireless communication system which properly performs the transmission and reception of the DL data signal 16, using the enhanced control signal region 17 in the DL subframe 1.

Hereinafter, with reference to drawings, embodiments of a wireless communication system, a wireless station, and a wireless communication method of a disclosure will be described. Further, although separate embodiments will be described for convenience, combining the embodiments allows an effect of a combination to be achieved and of course usefulness to be enhanced.

[a] Location of Problem

As described above, the inventors found that if an enhanced control signal region 17 is used in a DL subframe 1 which has been proposed for Release 11 such as in FIG. 2, the transmission and reception of a data signal 16 is not properly performed in some cases. Here, before describing respective embodiments, the problem found by the inventors will be described.

Figure 3:
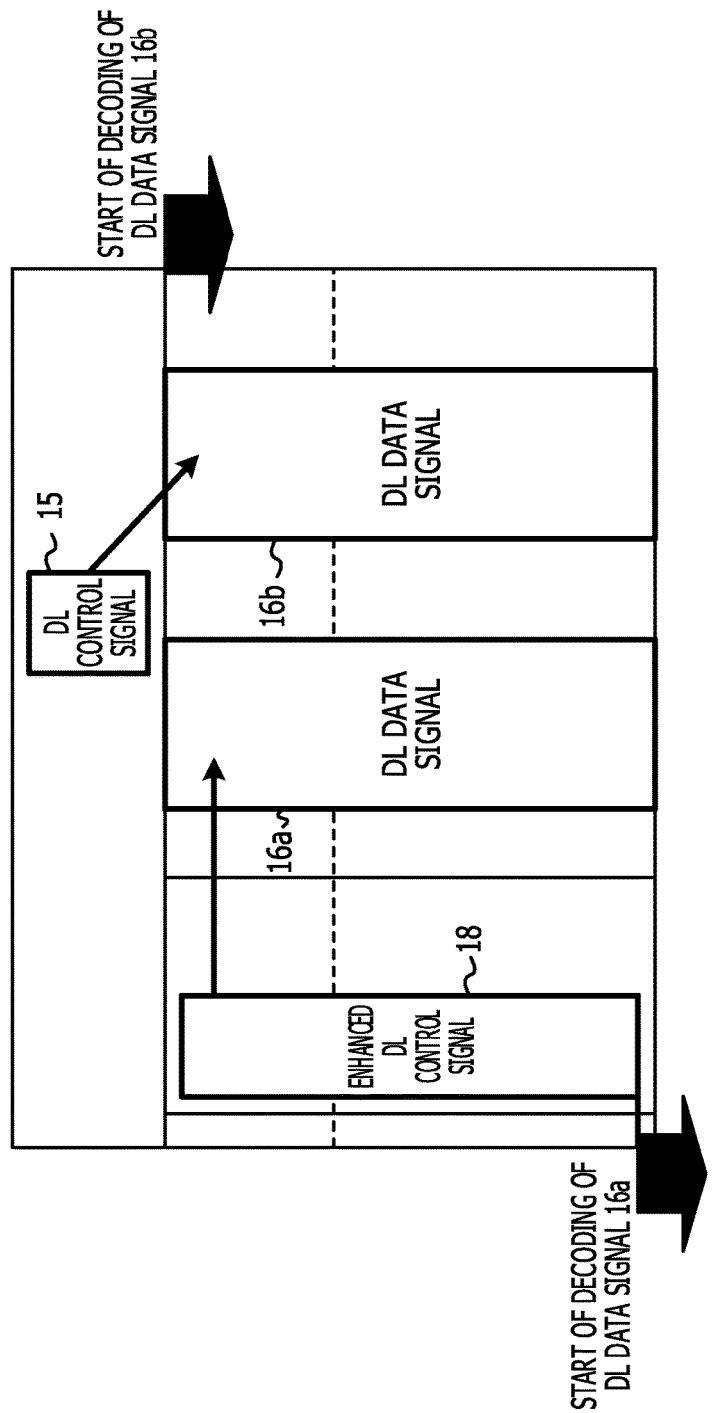
FIG. 3 is a diagram illustrating a problem of the DL subframe in Release 11 of 3GPP.

FIG. 3 is a diagram illustrating a problem of the DL subframe 1 of Release 11. In FIG. 3, similarly to FIG. 2, as an example, one DL control signal 15 is arranged in a control signal region 13, one enhanced DL control signal 18 is arranged in an enhanced control signal region 17, and two DL data signals 16a and 16b are arranged in a data signal region 14. Then, the enhanced DL control signal 18 is linked to the DL data signal 16a and the DL control signal 15 is linked to the DL data signal 16b.

The DL control signal 15 and the enhanced DL control signal 18 include information about an arrangement (RB allocation) and a Modulation and Coding Scheme (MCS) of each DL data signal 16, and the like as described above. Therefore, it is difficult to extract the DL data signal 16 and to demodulate and decode the DL data signal 16 before the completion of the demodulation and decoding of the DL control signal 15 and the enhanced DL control signal 18. In other words, if the demodulation and decoding of the DL control signal 15 and the enhanced DL control signal 18 is not completed, it is difficult to extract data from the DL data signal 16.

In decoding of the DL control signal 15 and the enhanced DL control signal 18, the decoding is performed in units of the DL control signal 15 and the enhanced DL control signal 18 after the demodulation is performed in units of resource elements which form the DL control signal 15 and the enhanced DL control signal 18. Here, it is assumed that the demodulation and decoding of the DL control signal 15 and the enhanced DL control signal 18 is completed at about the same time as the completion of reception of the DL control signal 15 and the enhanced DL control signal 18.

In this case, the reception and the demodulation and decoding of the DL control signal 15 in the existing control signal region 13 may be completed before the start of reception of the DL data signal 16b. Accordingly, as illustrated in FIG. 3, with respect to the DL data signal 16b, the demodulation and decoding may be started at the same time as the start of reception. In contrast, the reception and the demodulation and decoding of the DL control signal 18 in the enhanced control signal region 17 is completed with a considerable delay from the start of the reception of the DL data signal 16a (at a timing of the completion of reception of the DL data signal 16a). Accordingly, as illustrated in FIG. 3, the start of the demodulation and decoding of the DL data signal 16a is considerably delayed, as compared to the DL data signal 16b.

Roughly, two problems arise due to the delay of the start of the demodulation and decoding of the DL data signal 16a. One problem is seen in a transmission timing of an acknowledgement signal (indicating either ACK or NACK) in Hybrid Automatic Repeat reQuest (HARQ). If a wireless terminal succeeds in decoding data addressed thereto, it transmits an ACK signal indicating successful reception of the data, to the wireless base station which sent the data to the wireless terminal. Further, if the wireless terminal fails in decoding of the data addressed thereto, it transmits a NACK signal indicating failed reception of the data, to the wireless base station. Accordingly, the wireless terminal is unable to transmit the acknowledgement signal corresponding to a received data before decoding of the data is completed. In this document the term of "an acknowledgement signal" has the same meaning as "a response signal."

On the other hand, according to the LTE specifications, an acknowledgement signal corresponding to a DL signal transmitted in a DL subframe is transmitted in an UL subframe appearing 4 subframes (or 4 ms) after the DL subframe. Here, if the data signal 16a is large in size, the demodulation and decoding of the data signal may not be completed before the timing of transmission of the acknowledgement signal corresponding to the data, due to a larger delay of the demodulation and decoding than accepted as described above. In this case, it is difficult for the wireless terminal to send an appropriate acknowledgment signal to the wireless base station. Since the wireless base station determines whether or not the data is to be retransmitted based on the content of the acknowledgement signal, when the acknowledgement signal is inappropriate, unnecessary retransmission may occur or necessary retransmission may not be performed.

The other problem due to the delay of the start of the demodulation and decoding of the data signal 16a is that the delay could require the wireless terminal to have a large size of a buffer that stores received data to be processed. With respect to the DL data signal 16b corresponding to the DL control signal 15 in the control signal region 13, the reception and the demodulation and decoding start at the same time. Accordingly, a buffer of relatively small size sufficient to absorb the delay of the demodulation and decoding process may be used. In contrast, with respect to the DL data signal 16a corresponding to the enhanced DL control signal 18 in the enhanced control signal region 17, since there is a large amount of delay from the start of the reception to the start of the demodulation and decoding, a large buffer for storing all the data to be received during the delay time may be needed. Regardless of whether the enhanced control signal region 17 is used, all the wireless terminals capable of handling the enhanced control signal region 17 have to have a buffer of such a large size. An increase in the buffer size leads to an increase in hardware cost and an increase in circuit size, which is not desirable.

As described above, if the enhanced control signal region 17 in DL subframe 1 of Release 11 is used, the demodulation and decoding of received DL data signal may not be performed properly in some cases.

The technology of the disclosure is realized to resolve the above problem that the inventors found.

[b] First Embodiment

Figure 4:
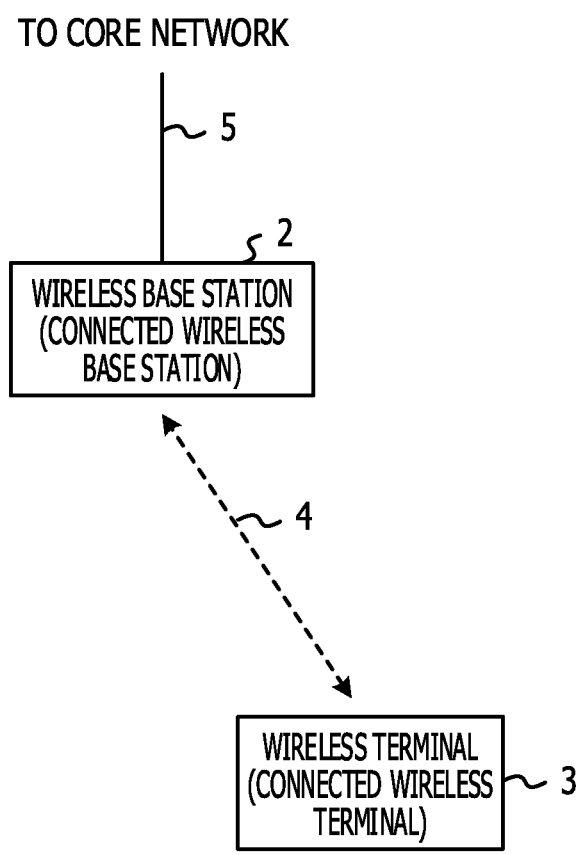
FIG. 4 is a diagram illustrating an example of a network configuration of a wireless communication system of a first embodiment.

FIG. 4 illustrates a network configuration of a wireless communication system in a first embodiment. The present embodiment is an embodiment of a wireless communication system that conforms to LTE. Therefore, some LTE-specific terms and concepts appear. However, the present embodiment is only an example, and is also applicable to a wireless communication system that conforms to a communication standard other than LTE.

The wireless communication system illustrated in FIG. 4 includes a wireless base station 2 (eNB: evolved Node B), a wireless terminal 3 (UE: User Equipment), and the like. In the following description, the wireless base station 2 and the wireless terminal 3 are collectively referred to as a wireless station.

A wireless network between the wireless base station 2 and the wireless terminal 3 is referred to as a wireless access network 4. A wired or wireless network (transmission network) called a backhaul network 5 is connected between the wireless base stations 2 and the core network or other wireless base station(s). The wireless base station 2 may communicate with an apparatus connected to the core network, through the backhaul network 5. A Mobility Management Entity (MME), a System Architecture Evolution Gateway (SAE-GW), or the like, not illustrated, is connected to the core network. In addition, an LTE network may be referred to as an Evolved Packet System (EPS). The EPS includes an Evolved Universal terrestrial Radio Network (eUTRAN) which is the wireless access network and an Evolved Packet Core (EPC) which is the core network. The core network may be referred to as a System Architecture Evolution (SAE).

The wireless base station 2 (may simply be referred to as a base station) in FIG. 4 performs wireless communication with the wireless terminal 3 through the wireless access network 4, and is connected to a backhaul network 5. The wireless base station 2 performs various control operations for the wireless terminal 3 by exchanging various control signals with the subordinate wireless terminal 3 as well as performing the transmission and reception of data with the subordinate wireless terminal 3 (also referred to as a connected wireless terminal). Further, the wireless base station 2 may cooperate with a separate wireless base station 2 by exchanging various pieces of control information with the separate wireless base station 2 as well as performing relaying of data with the separate wireless base station 2, through the backhaul network 5.

The wireless base station 2 performs the exchange of various pieces of control information with a control device such as an MME which is connected to the core network ahead of the backhaul network, through the backhaul network 5. Further, the wireless base station 2 relays the data received from the subordinate wireless terminal 3 to the relay device such as the SAE-GW connected to the core network, and relays the data received from the relay device such as the SAE-GW to the subordinate wireless terminal 3.

The wireless base station 2 may be connected to the backhaul network 5 in a wired or wireless manner. Further, the wireless base station 2 realizes a wireless communication function with the wireless terminal 3 through the wireless access network 4 to a Remote Radio Head (RRH) which is a separate apparatus, and the wireless terminal 3 and the RRH may be connected in a wired manner. Further, the wireless base station 2 may be a base station of any of various sizes, in addition to a macro-base station, and a small base station such as a pico-base station (including a micro-base station, a femto-base station, or the like). When the relay station which relays the wireless communication between the base station and the wireless terminal 3 is used, the relay station (the transmission and reception with a wireless terminal and the control thereof) may also be included in the wireless base station 2 in this specification.

In other words, a "cell" is a range that the wireless base station 2 covers, in order for the wireless terminal 3 to transmit and receive a wireless signal (strictly speaking, there are a UL cell and a DL cell. Further, when the antenna of the wireless base station 2 is a sector antenna, generally, a cell is formed for each sector, and a cell is formed for each wireless carrier since Release 10 of LTE, but since the wireless base station 2 and the cell are corresponding concepts to some extent, in the description of this specification, "cell" and "wireless base station" may be used interchangeably as is appropriate for convenience.

On the other hand, in FIG. 4, the wireless terminal 3 (may be referred to as a wireless mobile terminal, a mobile terminal, or simply terminal in some cases, further, it may be referred to as user equipment, a subscriber station, a mobile station, or the like in some cases) is an apparatus which performs wireless communication with the wireless base station 2 through the wireless access network 4. The wireless terminal 3 is connected to one wireless base station 2, and if a change occurs due to change in wireless circumstances, the wireless base station 2 to be connected is changed by handover. Here, "connection" indicates that the wireless terminal 3 is connected to the wireless base station 2, but may also be interpreted with a meaning of "in communication". The wireless base station 2 connected to the wireless terminal 3 is referred to as a connected wireless base station 2 or a serving cell. The wireless terminal 3 is subjected to various control operations by exchanging various pieces of control information through wireless communication with the connected wireless base station 2 as well as performing the transmission and reception of data with the connected wireless base station 2 through the wireless communication.

The wireless terminal 3 may be a terminal such as a cellular phone, a smart phone, a Personal Digital Assistant (PDA), or a personal computer. Further, when the relay station which relays the wireless communication between the wireless base station 2 and the terminal is used, the relay station (the transmission and reception with the wireless base station and the control thereof) may also be included in the wireless terminal 3 in this specification.

The wireless communication system of the present embodiment uses an Orthogonal Frequency Division Multiple Access (OFDMA) method as a DL wireless access method. Further, a Single Carrier Frequency Division Multiple Access (SC-FDMA) method is used as a UL wireless access method.

In the wireless communication system of the present embodiment, both a DL wireless signal and a UL wireless signal are configured with a radio frame (simply also referred to as frame) of a predetermined length (for example, 10 ms). Further, one radio frame is configured with a predetermined number (for example, 10) of radio subframes (simply also referred to as subframes) each having a predetermined length (for example, 1 ms). Then, each subframe is configured with 12 or 14 symbols. In addition, "frame" and "subframe" are only terms indicating a processing unit of a wireless signal, and thus they may be used interchangeably as it is appropriate in the following description.

Several physical channels are defined in the physical layer of LTE. For example, a DL physical channel includes a Physical Downlink Shared CHannel (PDSCH) used for transmitting the DL data signal 16 and a Physical Downlink Control CHannel (PDCCH) used for transmitting the DL control signal 15. The DL control signal 15 referred to herein is used to transmit a control signal which may be directly required for PDSCH transmission, and is a control signal of a level of a physical layer (or Layer1). In contrast, a control signal of a higher layer is transmitted using the PDSCH. Further, as described above, although the size of the control signal region 13 in the DL subframe 1 is variable (1 to 3 symbols from the start of the DL subframe 1), there is also a Physical Control Format Indicator CHannel (PCFICH) indicating the size of the control signal region 13 of the DL subframe 1 to all the wireless terminals receiving the DL subframe. On the other hand, a UL physical channel includes a Physical Uplink Shared CHannel (PUSCH) used for transmitting the UL data signal and a Physical Uplink Control CHannel (PUCCH) used for transmitting the UL control signal including an acknowledgement signal corresponding to the DL data signal 16, a DL radio-link quality and characteristic measurement result, or the like.

In addition to the DL data signal 16 and the DL control signal 15, DL reference signals for demodulation of the DL data signal 16 and for measurement of DL radio-link quality and characteristic are mapped to the DL subframe 1. In addition to the UL data signal and the UL control signal, UL reference signals for demodulation of the UL signal and for measurement of UL radio-link quality and characteristics are mapped to the UL subframe.

Figure 5:
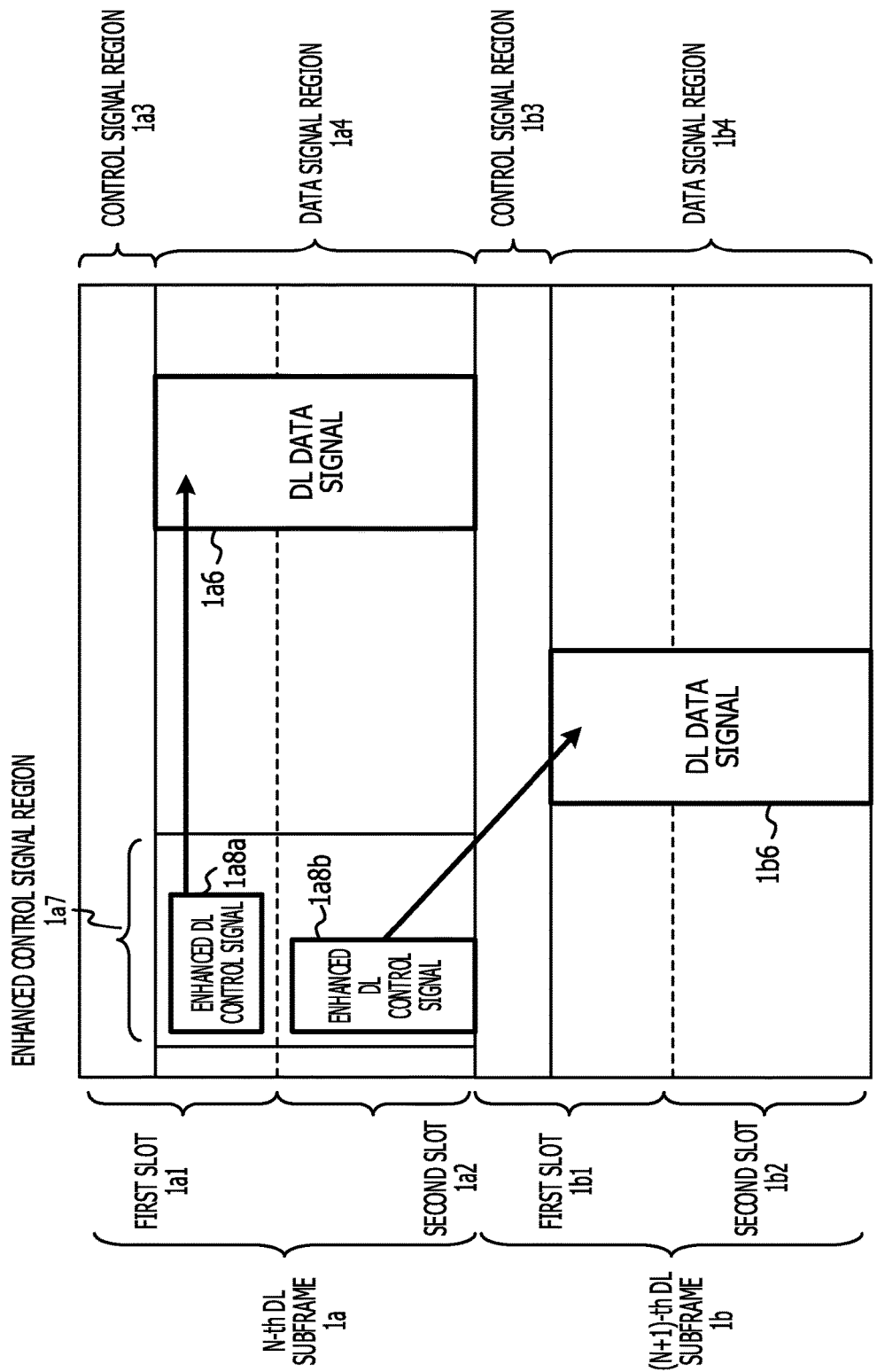
FIG. 5 is a diagram illustrating an example of a configuration of the DL subframe of the first embodiment.

Next, a frame configuration in the first embodiment is described based on FIG. 5.

FIG. 5 illustrates two DL subframes 1 which are temporally consecutive. In FIG. 5, the former DL subframe 1 on a time axis is referred to as an N-th DL subframe is (meaning of a DL subframe 1 in an N-th position). Further, the latter DL subframe 1 on a time axis is referred to as a (N+1)-th DL subframe 1b (meaning of a DL subframe 1 in an (N+1)-th position).

In FIG. 5, an enhanced control signal region 1a7 is configured in the N-th DL subframe 1a, and two enhanced DL control signals 1a8a and 1a8b are arranged in the enhanced control signal region 1a7. The enhanced DL control signal 1a8a is arranged so as to be fitted in a first slot 1a1 of the N-th DL subframe 1a. In contrast, the enhanced DL control signal 1a8b is arranged so as to be fitted in a second slot 1a2 (other than the first slot 1a1) of the N-th DL subframe 1a. Further, one DL data signal 1a6 is arranged in a data signal region 1a4 of the N-th DL subframe 1a, and one DL data signal 1b6 is also arranged in the (N+1)-th DL subframe 1b which is the subsequent DL subframe 1. In addition, in the following description, a plurality of the same objects may be denoted by omitting reference symbols (letters), for example, in such a manner that a plurality of enhanced DL control signals 1a8a and 1a8b in the N-th DL subframe is are collectively referred to as "an enhanced DL control signal 1a8" or the enhanced DL control signals are collectively referred to as "an enhanced DL control signal 18".

In FIG. 5, the enhanced DL control signal 1a8a is linked to the DL data signal 1a6 arranged in the N-th DL subframe 1a. In other words, the enhanced DL control signal 1a8a is linked to the DL data signal 1a6 in the same DL subframe 1 as the DL subframe 1 in which the enhanced DL control signal 1a8a is arranged. In contrast, the enhanced DL control signal 1a8b is linked to the DL data signal 1b6 arranged in the (N+1)-th DL subframe 1b. In other words, the enhanced DL control signal 1a8b is linked to the DL data signal 1b6 in the DL subframe which is subsequent to the DL subframe in which the enhanced DL control signal 1a8b is arranged.

To summarize the above, the enhanced DL control signal 1a8a arranged in the first slot 1a1 of the enhanced control signal region 1a7 is linked to the DL data signal 1a6 arranged in the same DL subframe 1 (N-th DL subframe 1a) as the DL subframe 1 in which the control signal 1a8a is arranged. In contrast, the enhanced DL control signal 1a8b arranged in the second slot 1a2 of the enhanced control signal region 1a7 is linked to the DL data signal 1b6 arranged in the DL subframe ((N+1)-th DL subframe 1b) which is subsequent to the DL subframe in which the enhanced DL control signal 1a8b is arranged.

A decoding delay of the enhanced DL control signal 18 can be shortened by using the frame configuration illustrated in FIG. 5, as compared to the related technology illustrated in FIG. 3. First, the enhanced DL control signal 1a8a in the first slot 1a1 may be demodulated and decoded until the completion of reception of the first slot 1a1, and thus the demodulation and decoding of the DL data signal 1a6 in the same subframe may be started with a relatively small delay. Further, the enhanced DL control signal 1a8b in the second slot 1a2 may be demodulated and decoded until the completion of reception of the second slot 1a2, and thus the demodulation and decoding of the DL data signal 1b6 in the subsequent subframe may be started without delay. Accordingly, since the delay in the start of demodulation and decoding of the DL data signal 16 is removed or sufficiently shortened, the problem of retransmission control and the buffer as described above is resolved or mitigated.

In addition, in the application of the DL subframe 1 of FIG. 5, it is desirable to limit the data size of the DL data signal 1a6 in the same frame, which is the control target of the enhanced DL control signal 1a8a in the first slot 1a1, to be small. That is because if the data size is small, time for the demodulation and decoding is short, and thus it is possible to mitigate the aforementioned problem caused by the delay in the start of the demodulation and decoding for DL data signal 1a6 based on the delay of the demodulation and decoding of the enhanced DL control signal 1a8a.

On the other hand, for the DL data signal 1b6 in the subsequent frame which is a control target of the enhanced DL control signal 1a8b in the second slot 1a2, the data size may also be large. That is because there is no delay of start of the demodulation and decoding for the DL data signal 1b6.

Figure 6:
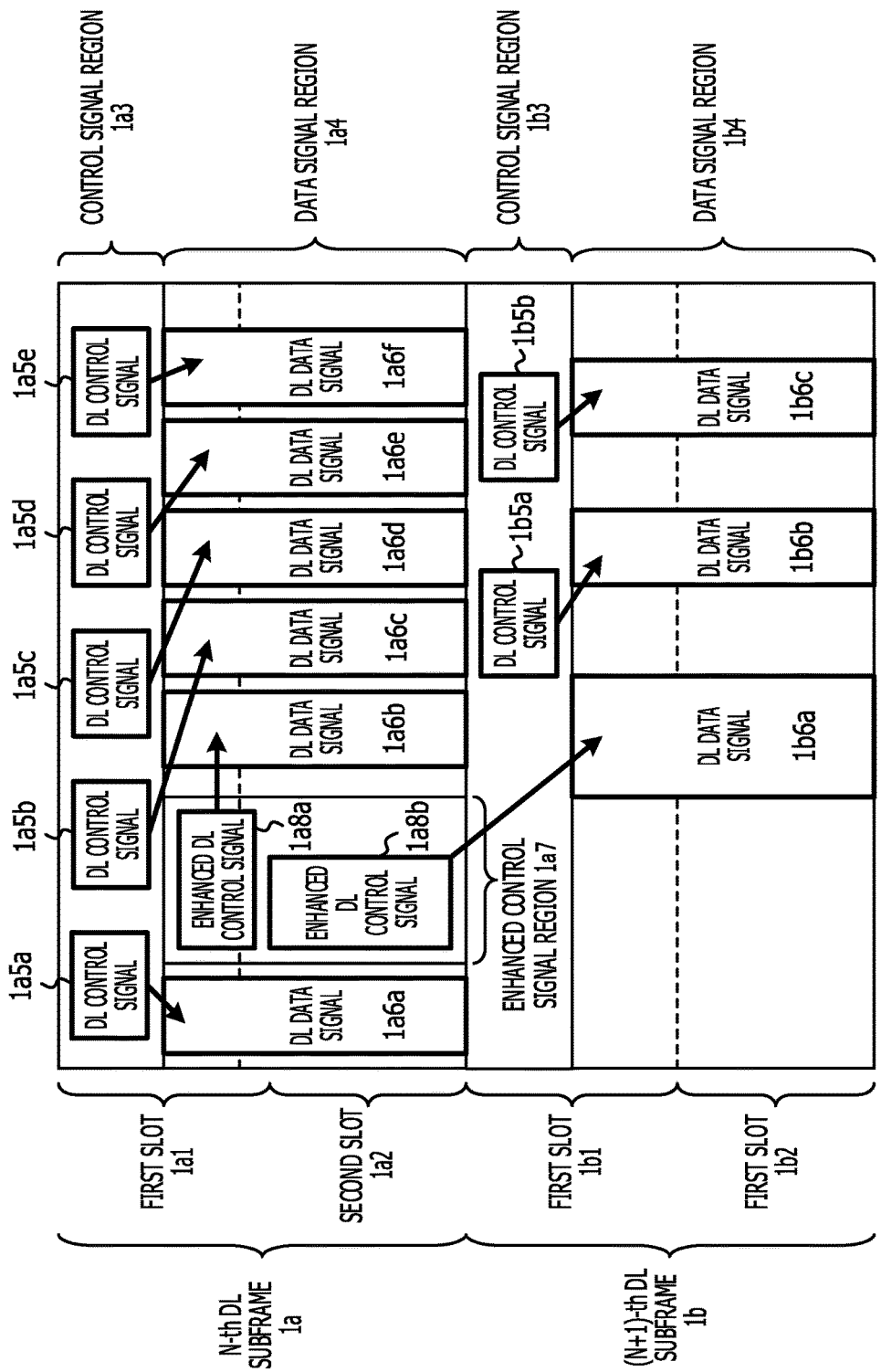
FIG. 6 is a diagram illustrating another example of the configuration of the DL subframe of the first embodiment.

Further, although the enhanced DL control signal 1a8 in the enhanced control signal region 1a7 is mainly described in the above description, as illustrated in FIG. 6, it is needless to say that the DL control signal 1a5 in the control signal region 1a3 is described as well. However, a case where the DL control signal 1a5 of the control signal region 1a3 (or the control signal region 1a3 itself) is not used is not considered. In other words, only the enhanced control signal region 1a7 may be used, without using the control signal region 1a3.

In addition, although the treatment of the enhanced DL control signal 1a8a in the first slot 1a1 and the enhanced DL control signal 1a8b in the second slot 1a2 is described in the above description, the treatment of the enhanced DL control signal 1a8 located across two slots may be separately defined. For example, the enhanced DL control signal 1a8 located across two slots may be regarded as being arranged in the first slot 1a1, may be regarded as being arranged in the second slot 1a2, or may be ignored (treated as invalid).

Since the control signal region 1a3 (corresponding to PDCCH) is located across the entire DL transmission band, there are various restrictions. For example, Inter-Cell Interference Coordination (ICIC) has been introduced in Release 8 of 3GPP. ICIC is intended to perform data transmission in a cell while the data transmission is not interfered with by its adjacent cell(s), by setting a specific "blank" data region in the transmission band of one or some of the adjacent cells not to be used for data transmission. ICIC may be relatively easily applied to the DL data signal 1a6. However, since the control signal region 1a3 is located across the entire DL transmission band, it is difficult to set a certain "blank" region in the control signal region 1a3 which is not used for transmission of control signals which would otherwise interfere with adjacent cells. Accordingly, it is difficult to apply ICIC to the DL control signal 1a5 in the control signal region 1a3.

In contrast, in the enhanced control signal region 1a7 (corresponding to an E-PDCCH), data signals may be transmitted only with a certain frequency bandwidth in a data region, similarly to the data signal 1a6a. Therefore, it is possible to apply ICIC to the DL control signal 1a5 in the enhanced control signal region 1a7. Accordingly, when suppressing interference between base stations is intended, it is possible to use only the enhanced control signal region 1a7 (E-PDCCH) without using the control signal region 1a3 (PDCCH).

Figure 7:
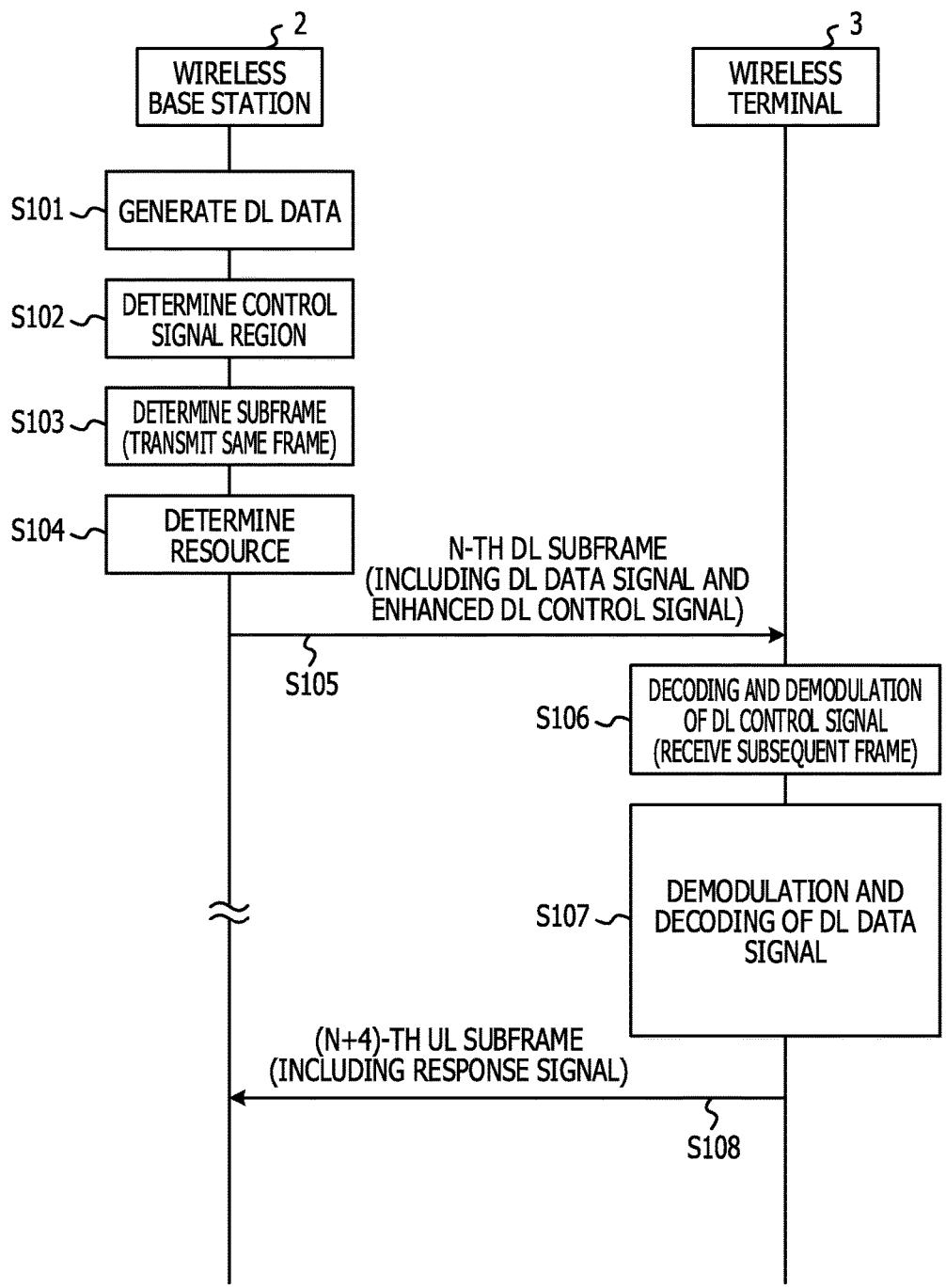
FIG. 7 is a diagram illustrating an example of a processing sequence (a case of transmission in a same frame) of the first embodiment.
Figure 9:
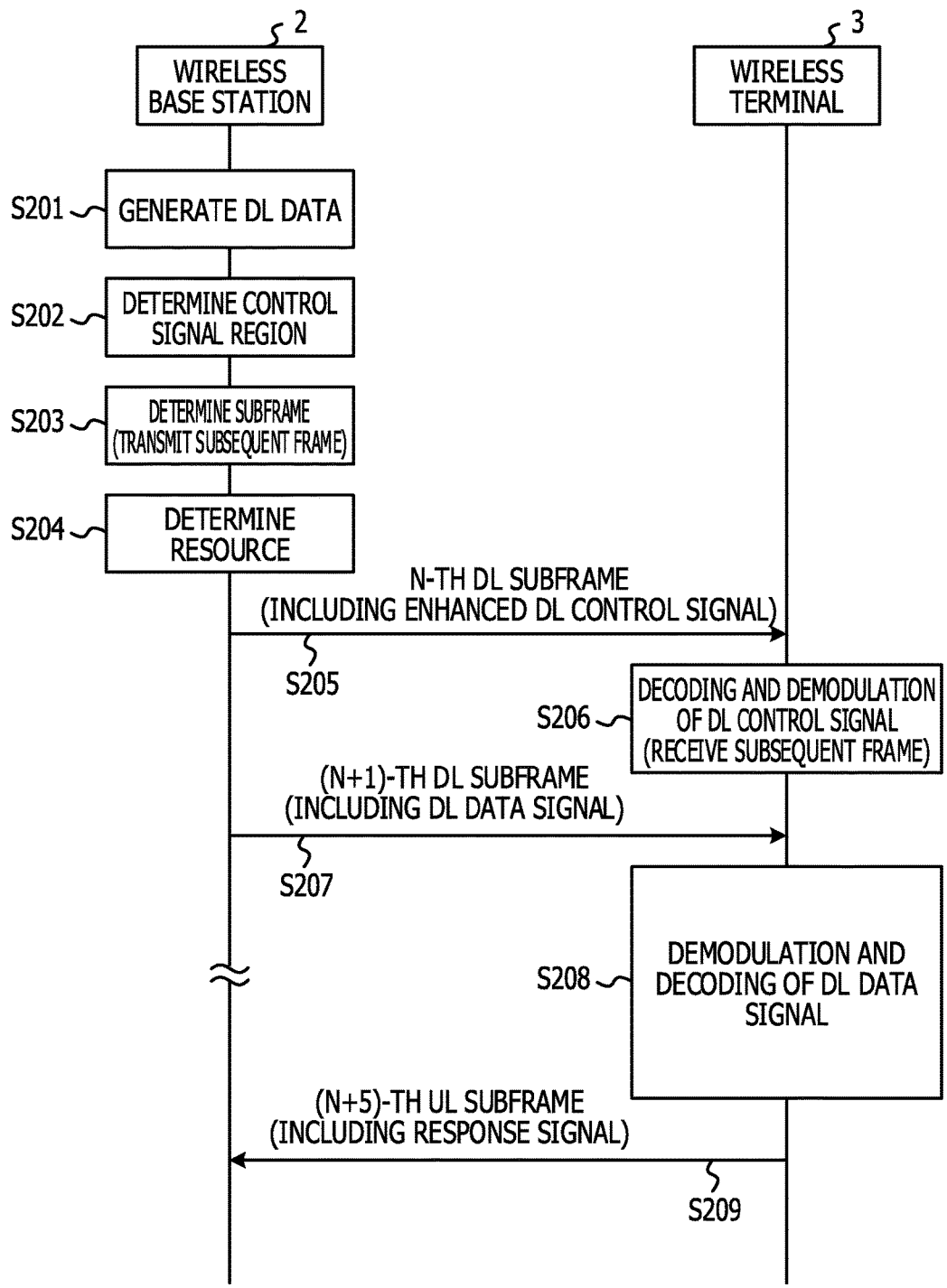
FIG. 9 is a diagram illustrating an example of a processing sequence (a case of transmission in a subsequent frame) of the first embodiment.

A processing sequence for the first embodiment is described based on FIG. 7 to FIG. 9.

FIG. 7 is a diagram illustrating an example of a processing sequence in a case of transmitting the DL data signal 1a6 which is the control target of the enhanced DL control signal 1a8 and the enhanced DL control signal 1a8 in the same DL subframe is (in a case of simultaneous transmission).

First, in FIG. 7, prior to S101, the wireless base station 2 transmits a signal including information indicating resource arrangement (a frequency band to which an enhanced signal region is allocated) of the enhanced control signal region 1a7 in the DL subframe 1 to the wireless terminal 3. The signal, not illustrated in FIG. 7, including the information may be a higher-layer signaling, which may be called RRC signaling. Thus, the wireless terminal 3 is able to recognize in advance the resource arrangement (e.g. the location) of the enhanced control signal region 1a7.

In S101 of FIG. 7, DL data is generated in the wireless base station 2. For example, DL data is generated when a different wireless terminal transmits an audio signal, data, and the like to a subordinate wireless terminal 3, when a server on the Internet transmits data to the wireless terminal 3, or the like. Further, the wireless base station 2 transmits a control signal of a higher layer level, which includes the content of an operation mode, by which the wireless terminal 3 changes its operation mode.

In S102, the wireless base station 2 determines whether to arrange a control signal corresponding to a DL control information (DCI) to be transmitted in association with the transmission of the DL data in the control signal region 1a3 (corresponding to the PDCCH) or to arrange it in the enhanced control signal region 1a7 (corresponding to the E-PDCCH). In other words, the wireless base station 2 determines whether to arrange the DL control information (DCI) as the DL control signal 1a5 (corresponding to the PDCCH) or to arrange it as the enhanced DL control signal 1a8 (corresponding to the E-PDCCH). The determination may be performed according to any applicable rule. As an example, when there are a lot of vacant regions in the control signal region 1a3, it is possible to arrange the DL control signal 1a5 corresponding to the DL control signal in the control signal region 1a3, and when there are few vacant regions in the control signal region 1a3, it is possible to arrange the enhanced DL control signal 1a8a corresponding to the DL control signal in the enhanced control signal region 1a7. It is assumed that the wireless base station 2 of FIG. 7 determines to transmit the enhanced DL control signal 1a8 in the enhanced control signal region 1a7 in S102. In addition, in S102, when the wireless base station 2 determines to transmit the DL control signal 1a5 in the control signal region 1a3, a general transmission process of the DL data may be performed.

Next, in S103, the wireless base station 2 determines whether to set the DL subframe 1 for transmitting the DL data as the same DL subframe is as that of the enhanced DL control signal 1a8 (same transmission) or to set the DL subframe 1 as the subsequent DL subframe 1b to that of the enhanced DL control signal 1a8 (separate transmission). The determination may be performed according to any applicable rule. As an example, if the size (for example, bit length or byte length) of the DL data is less than a predetermined value, the simultaneous transmission may be determined; whereas if the size is equal to or greater than the predetermined value, the separate transmission may be determined. The wireless base station 2 of FIG. 7, in S103, determines to perform the simultaneous transmission of the enhanced DL control signal 1a8 and the DL data (corresponding DL data signal 1a6).

In S104, the wireless base station 2 determines a DL radio resource for transmitting the DL data to the wireless terminal 3 (performs a scheduling of the radio resource). At this time, the wireless base station 2 determines a radio resource for the data signal 1a6, in the same DL subframe 1 as that of the enhanced DL control signal 1a8, based on the determination of S103. Since the determination of the DL radio resource conforms to a general method considering DL radio-link quality and characteristics of the wireless terminal 3 and the number of terminals or the like to be scheduled simultaneously, the detailed description thereof will be omitted.

In S105, the wireless base station 2 transmits the DL subframe 1 including the DL data to the wireless terminal 3. At this time, the wireless base station 2 transmits (same transmission) the DL data (corresponding DL data signal 1a6) and the enhanced DL control signal 1a8 which is the control target of the DL data in the same DL subframe 1, based on the determination in S103. The DL subframe 1 is set as the N-th DL subframe 1*a*.

An N-th DL subframe is transmitted by the wireless base station 2 in S105 is described in detail. The wireless base station 2 arranges the enhanced DL control signal 1*a*8 corresponding to the DL data in the enhanced control signal region 1*a*7, based on the determination in S102, in the N-th DL subframe 1*a*. Further, at this time, the wireless base station 2 arranges the enhanced DL control signal 1*a*8 in the N-th DL subframe is according to the arrangement rule of the enhanced control signal 1*a*8 of a case of the simultaneous transmission, based on the determination of S103. In the first embodiment, arranging the enhanced DL control signal 1*a*8 so as to be fitted in the first slot 1*a*1 of the enhanced control signal region 1*a*7 of the N-th DL subframe is the enhanced DL control signal arrangement rule in a case of the simultaneous transmission. Meanwhile, arranging the enhanced DL control signal 1*a*8 to be fitted in the second slot 1*a*2 of the enhanced control signal region 1*a*7 of the N-th DL subframe is the enhanced DL control signal arrangement rule in a case of the separate transmission. The wireless base station 2 in FIG. 7 arranges the enhanced DL control signal 1*a*8 so as to be fitted in the first slot 1*a*1 of the enhanced control signal region 1*a*7 of the N-th DL subframe is based on the determination of S103.

However, the wireless base station 2 arranges the DL data signal 1*a*6 which is the control target of the enhanced DL control signal 1*a*8 which is arranged in advance, in the N-th DL subframe 1*a*, based on the determination of S104. Thus, the N-th DL subframe is includes the DL data signal 1*a*6 and the enhanced DL control signal 1*a*8 corresponding to the DL data signal 1*a*6.

In S105, the wireless terminal 3 receives the N-th DL subframe 1*a*. Then, in S106, the wireless terminal 3 demodulates and decodes the DL control signal 1*a*5 and the enhanced DL control signal 1*a*8 included in the received N-th DL subframe 1*a*. At this time, the wireless terminal 3 basically demodulates and decodes all the DL control signals 1*a*5*a* and the enhanced DL control signal 1*a*8 which are arranged in the control signal region 1*a*3 and the enhanced control signal region 1*a*7 based on a predetermined process (details are omitted) regardless of whether the DL control signals and the enhanced DL control signals are addressed to the wireless terminal 3, check whether DL control signals and/or enhanced DL control signals addressed to the wireless terminal 3 exist in the control signal region and the enhanced control signal region and extract control information from detected control signal and/or enhanced control signal if existing, but the wireless terminal 3 has to perform the checking process as to whether or not the DL control signal 1*a*5 and the enhanced DL control signal 1*a*8 are presently addressed to the wireless terminal 3 in both the control signal region 1*a*3 and the enhanced control signal region 1*a*7 in not all the DL subframes 1. For example, the wireless base station 2 may instruct the wireless terminal 3 not to perform the demodulation and decoding process for the control signal region 1*a*3 in a specific set of DL subframes within every radio frame of a length of 10 milliseconds, using a control signal of a higher layer, in advance. In the same manner, the wireless base station 2 may instruct the wireless terminal 3 not to perform the demodulation and decoding process for the enhanced control signal region 1*a*7 in a specific set of DL subframes within every radio frame of a length of 10 milliseconds, using a control signal of a higher layer, in advance.

Here, FIG. 8 illustrates an example of a format of the DL control information carried on the DL control signal 1*a*5 or the enhanced DL control signal 1*a*8 in the present embodiment. The DL control information illustrated in FIG. 8 uses Data Control Information (DCI) which is a DL control signal defined in LTE, as it is. The DCI is coded and modulated so as to generate the DL control signal 1*a*5 or the enhanced DL control signal 1*a*8.

The DL control information (DCI) of FIG. 4 includes a Cyclic Redundancy Check (CRC) of a 16 bit length scrambled with a Radio Network Temporary Identifier (RNTI) of a 16 bit length which is an identifier of a wireless terminal 3 to which the DL control signal 1*a*5*a* addresses, a Resource block assignment (RB assignment) which is information indicating a radio resource in which data is allocated (which resource block (RB) in a subframe in which the data is allocated), and a Modulation and Coding Scheme (MCS) indicating a modulation and coding scheme applied to data. Further, in FIG. 8, the CRC scrambled with the RNTI is denoted by RNTI for convenience. Further, in addition to these control information elements, the DCI includes parameters such as Redundancy Version (RV), New Data Indicator (NDI), a Hybrid Automatic Repeat reQuest (HARQ) processing number, and PUCCH power control. The details of the control information elements included in the DL control signal is not described in this document.

Further, there are several formats for the DL control information (DCI). For example, in the LTE specification, DCI formats 0 and 4 are defined as DL Control Information used to schedule UL data signal (Physical Uplink Shared CHannel (PUSCH)). DCI Formats 1, 1A, 1B, 1C, 1D, 2, 2A, 2B, 2C and 2D are defined as DL Control Information used to schedule DL data signal (Physical Downlink Shared CHannel (PDSCH)). The type of the DCI format to be used for scheduling of DL data signal transmission to a wireless terminal is changed by the wireless base station, depending on the type of transmission schemes (e.g. transmit diversity, two-layer spatial multiplexing, eight-layer spatial multiplexing, open-loop spatial multiplexing . . . ) applied to the DL data signal transmission.

In S106 of FIG. 7, the wireless terminal 3 recognizes (detects) whether the data signal to which the DL control signal 1*a*5 or the DL control signal 1*a*8 is associated with is the UL data signal or the DL data signal 1*a*6, based on the format of the DL control information (DCI) obtained by demodulating and decoding the DL control signal 1*a*5 or the enhanced DL control signal 1*a*8 which are detected. Further, the wireless terminal 3 recognizes (detects) the DL control information addressed to the wireless terminal 3, based on the RNTI of the DL control information. The CRC of a 16 bit length within the DL control information is scrambled with the identification number (RNTI) of the wireless terminal 3, and thus the contents of the DL control information addressed to a certain terminal is not decrypted by other wireless terminals as long as a sudden error does not occur.

In S106, when the detected DL control information (DCI) addressed to the wireless terminal 3 is based on the enhanced DL control signal 1*a*8, the wireless terminal 3 determines whether the control object of the enhanced DL control signal 1*a*8 is the DL data signal 1*a*6 of the same DL subframe is or the DL data signal 1*b*6 of the subsequent DL subframe 1*b*, based on the arrangement of the enhanced DL control signal 1*a*8. When the enhanced DL control signal 1*a*8 is arranged in the first slot 1*a*1 of the enhanced control signal region 1*a*7, the wireless terminal 3 in the first embodiment determines that the control object of the enhanced DL control signal 1*a*8 is the DL data signal 1*a*6 in the same frame (that is, N-th subframe 1a). In contrast, when the enhanced DL control signal 1a8 is arranged in the second slot 1a2 of the enhanced control signal region 1a7, the wireless terminal 3 determines that the control object of the enhanced DL control signal 1a8 is the data signal 1b6 in the subsequent frame (that is, (N+1)-th subframe 1b). In the example of FIG. 7, the enhanced DL control signal 1a8 is arranged in the first slot 1a1 of the enhanced control signal region 1a7 (S105), and thus the wireless terminal 3 determines that the control object of the enhanced DL control signal 1a7 is the same frame (N-th subframe 1a). In addition, in S106, when the detected DL control information (DCI) addressed to the wireless terminal 3 is based on the DL control signal 1a5, the wireless terminal 3 determines that the control object of the DL control signal 1a5 is the DL data signal 1a6 in the same frame.

In S107, the wireless terminal 3 demodulates and decodes the DL data signal 1a6 which is the control object of the enhanced DL control signal 1a8 detected in S106. At this time, the wireless terminal 3 in FIG. 7 demodulates and decodes the DL data signal 1a6 in the N-th DL subframe 1a, based on the determination in S106. The wireless terminal 3 extracts the DL data signal 1a6 from the N-th DL subframe 1a, based on the RB assignment included in the DL control information (DCI) which is obtained from the received enhanced DL control signal 1a8, and demodulates and decodes the DL data signal 1a6 based on the MCS indicated in the DCI.

In S108, the wireless terminal 3 transmits an acknowledgement signal corresponding to the received DL data signal 1a6, to the wireless base station 2. Here, as an example, a transmission timing of the acknowledgement signal is determined as a UL subframe appearing four subframes after the DL subframe 1 in which the DL data signal 1a6 is received. The transmission timing can be a different value in LTE TDD system or further enhanced versions of LTE. In the example of FIG. 7, since the DL data signal 1a6 is received in the N-th DL subframe 1a, the acknowledgement signal is transmitted in the (N+4)-th UL subframe. What the acknowledgement signal indicates is based on the decoding result in S107. That is, the acknowledgement signal indicates either ACK (successful decoding) or NACK (erroneous decoding). In contrast, the wireless base station 2 determines whether or not to retransmit the data signal 1a6 by receiving the acknowledgement signal.

In addition, in S108, the wireless terminal 3 may determine the UL radio resource to use for transmission of the acknowledgement signal in the UL subframe, using one of the following manners. For example, when assignment information of the UL radio resource is included in the N-th DL subframe, the wireless terminal 3 may transmit the acknowledgement signal, using UL radio resource specified by the assignment information. Further, when the assignment information of the UL radio resource is not included in the N-th DL subframe, for example, the wireless terminal 3 may use a UL radio resource which is notified by a control signal of a higher layer in advance. As another example, when the assignment information of the UL radio resource is not included in the N-th DL subframe, the wireless terminal 3 may determine the UL radio resource based on the DL radio resource used in transmission of the enhanced DL control signal included in the N-th DL subframe (can determine the UL radio resource in association with the identification number of Control Channel Element (CCE)).

Next, a case of transmitting the DL data signal 1b6 which is the control object of the enhanced DL control signal 1a8 in the subsequent DL subframe 1b to the DL subframe is including the enhanced DL control signal 1a8 (case of separate transmission) will be described. FIG. 9 is a diagram illustrating an example of a processing sequence in a case of performing separate transmission of the enhanced DL control signal 1a8 and the DL data signal 1b6 which is the control target of the enhanced DL control signal 1a8.

The process up to S202 of FIG. 9 is the same as that up to S102 of FIG. 7, and thus the description thereof will be omitted.

In S203 of FIG. 9, the wireless base station 2 determines whether to set the DL subframe 1 for transmitting the DL data as the same DL subframe is as that of the enhanced DL control signal 1a8 (same transmission) or to set the DL subframe 1 as the subsequent DL subframe 1b to that of the enhanced DL control signal 1a8 (separate transmission), in the same manner as S103 of FIG. 7. The wireless base station 2 of FIG. 9, in S203, determines to perform the separate transmission of the enhanced DL control signal 1a8 and the DL data signal 1b6.

In S204, the wireless base station 2 determines a DL radio resource for transmitting the DL data to the wireless terminal 3 (performs a scheduling of a radio resource). At this time, the wireless base station 2 determines the radio resource for transmitting the DL data signal 1b6, in the subsequent DL subframe 1b to the DL subframe is for transmitting the enhanced DL control signal 1a8, based on the determination of S203. The determination of the DL radio resource may conform to a general method, and thus the description thereof will be omitted.

In S205, the wireless base station 2 transmits the DL subframe is including the enhanced DL control signal 1a8 to the wireless terminal 3. The DL subframe is assumed to be the N-th DL subframe 1a. At this time, the wireless base station 2 does not transmit the DL data signal 1b6 which is the control target of the enhanced DL control signal 1a8, based on the determination of S203, in the N-th DL subframe 1a.

Here, the wireless base station 2 arranges the enhanced DL control signal 1a8 corresponding to the DL data in the enhanced control signal region 1a7, based on the determination of S202, in the N-th DL subframe 1a. Further, at this time, the wireless base station 2 arranges the enhanced DL control signal 1a8, according to an enhanced DL control signal arrangement rule of a case of the separate transmission, based on the determination of S203, in the DL subframe 1. In the first embodiment, arranging the enhanced DL control signal 1a8 so as to be fitted in the first slot 1a1 of the enhanced control signal region 1a7 of the N-th DL subframe is the enhanced DL control signal arrangement rule in a case of the simultaneous transmission. In contrast, arranging the enhanced DL control signal 1a8 to be fitted in the second slot of the enhanced control signal region 1a7 of the N-th DL subframe is the enhanced DL control signal arrangement rule of the case of the separate transmission. The wireless base station 2 in FIG. 9 arranges the enhanced DL control signal 1a8 so as to be fitted in the second slot 1a2 of the enhanced control signal region 1a7 of the N-th DL subframe is based on the determination of S203.

In addition, the wireless base station 2 does not arrange the DL data corresponding to the enhanced DL control signal 1a8 which is arranged in advance, in the N-th DL subframe 1a, based on the determination of S203. Thus, it is assumed that the N-th DL subframe is does not include the DL data, but includes the enhanced DL control signal 1a8 corresponding to the DL data.

In S205, the wireless terminal 3 receives the N-th DL subframe 1a. Then, in S206, the wireless terminal 3 demodulates and decodes the enhanced DL control signal 1a8 of the received N-th DL subframe 1a. At this time, the wireless terminal 3 demodulates and decodes the DL control signals 1a5 and the enhanced DL control signal 1a8 which are arranged in the control signal region 1a3 and the enhanced control signal region 1a7 based on a predetermined process (details are omitted), similarly to S206 in FIG. 7. The wireless terminal 3 recognizes (detects) whether the application object of the DL control signal 1a5 or the enhanced DL control signal 1a8 is the UL data or the DL data, based on the format of the DL control information (DCI) obtained by demodulating and decoding the DL control signal 1a5 or the enhanced DL control signal 1a8 which are detected. Further, the wireless terminal 3 recognizes (detects) the enhanced DL control signal 8 addressed to the wireless terminal 3, based on the RNTI of the DL control signal.

In S206, when the detected DL control information (DCI) addressed to the wireless terminal 3 is based on the enhanced DL control signal 1a8, the wireless terminal 3 determines whether the control object of the enhanced DL control signal 1a8 is the data signal 1a6 of the same DL subframe is or the data signal 1b6 of the subsequent DL subframe 1b, based on the arrangement of the enhanced DL control signal 1a8. When the enhanced DL control signal 1a8 is arranged in the first slot 1a1 of the enhanced control signal region 1a7, the wireless terminal 3 in the first embodiment determines that the control object of the enhanced DL control signal 1a8 is the data signal 1a6 in the same frame (that is, N-th DL subframe 1a). In contrast, when the enhanced DL control signal 1a8 is arranged in the second slot 1a2 of the enhanced control signal region 1a7, the wireless terminal 3 determines that the control object of the enhanced DL control signal 1a8 is the data signal 1b6 in the subsequent frame (that is, (N+1)-th subframe 1b). In the example of FIG. 9, the enhanced DL control signal 1a8 is arranged in the first slot 1a2 of the enhanced control signal region 1a7 (S205), and thus the wireless terminal 3 determines that the control object of the enhanced DL control signal 1a8 is the subsequent frame ((N+1)-th subframe 1b).

In S207, the wireless base station 2 transmits the DL subframe 1 including the DL data signal 1b6 generated by coding and modulating the DL data to the wireless terminal 3. The radio frame is the N+1 subframe 1b which is the subsequent DL subframe to the DL subframe is which is the DL subframe for transmitting the enhanced DL control signal 1a8, based on the determination of S203. The wireless base station 2 transmits the DL data signal 1b6 based on the radio resource determined in S204, in the N+1 subframe 1b.

In S207, the wireless terminal 3 receives the (N+1)-th DL subframe 1b. Then, in S208, the wireless terminal 3 demodulates and decodes the DL data signal 1b6 which is the control object of the enhanced DL control signal 1a8 detected in S206. At this time, the wireless terminal 3 in FIG. 9 demodulates and decodes the DL data signal 1b6 in the (N+1)-th DL subframe 1b, based on the determination in S206. The wireless terminal 3 extracts the DL data signal 1b6 from the (N+1)-th DL subframe 1a, based on the RB assignment included in the DL control information (DCI) which is obtained from the received enhanced DL control signal 1a8, and demodulates and decodes the DL data signal 1b6 based on the MCS.

In S209, the wireless terminal 3 transmits an acknowledgement signal corresponding to the received DL data signal 1b6 to the wireless base station 2. Here, as an example, a transmission timing of the acknowledgement signal is determined as a UL subframe four subframes after the DL subframe 1 in which the DL data signal 1b6 is received. In the example of FIG. 9, since the DL data signal 1b6 is received in the (N+1)-th DL subframe 1b, the acknowledgement signal is transmitted in the (N+5)-th UL subframe. Since the determination of the type (contents) of the response signal and the UL radio resource used when the response signal is transmitted is the same as that in S108 of FIG. 7, the description thereof is omitted.

Respective device configurations in the first embodiment will be described based on FIG. 10 to FIG. 11.

Figure 10:
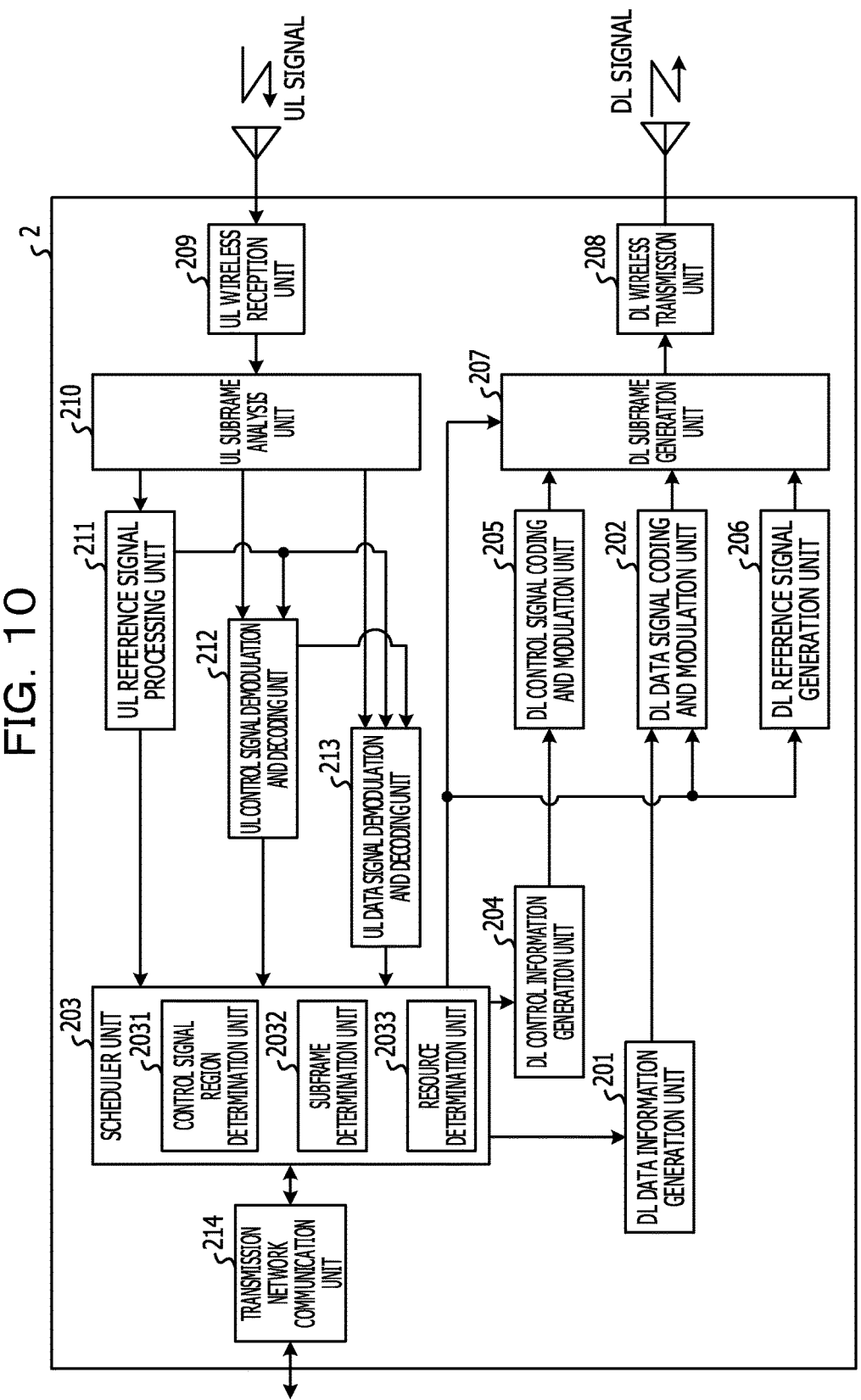
FIG. 10 is an example of a functional configuration diagram of a wireless base station in a wireless communication system of the first embodiment.

FIG. 10 is a diagram illustrating an example of functional configurations of the wireless base station 2 in the first embodiment. The wireless base station 2 includes, for example, a DL data information generation unit 201, a DL data signal coding and modulation unit 202, a scheduler unit 203, a DL control information generation unit 204, a DL control signal coding and modulation unit 205, a DL reference signal generation unit 206, a DL subframe generation unit 207, a DL wireless transmission unit 208, a UL wireless reception unit 209, a UL subframe analysis unit 210, a UL reference signal processing unit 211, a UL control signal demodulation and decoding unit 212, a UL data signal demodulation and decoding unit 213, and a transmission network communication unit 214. Further, the scheduler unit 203 includes a control signal region determination unit 2031, a subframe determination unit 2032, and a resource determination unit 2033.

The DL data information generation unit 201 generates DL data information and inputs the generated DL data information to the DL data coding and modulation unit 201. Further, if the DL data is generated, the DL data information generation unit 201 makes a request for scheduling for transmission of the DL data information to the scheduler unit 203. The DL data coding and modulation unit 202 codes and modulates the DL data information based on a coding scheme and a modulation scheme which are input from the scheduler unit 203 so as to generate a DL data signal 16, and inputs the DL data signal 16 to the DL subframe generation unit 207.

The scheduler unit 203 performs scheduling of a radio resource used in wireless communication and performs various control operations associated with the scheduling of the radio resource.

The control signal region determination unit 2031 determines whether to arrange a control signal corresponding to the DL control information transmitted together at the time of transmission of the DL data in the control signal region 1a3 (corresponding to the PDCCH) or in the enhanced control signal region 1a7 (corresponding to the E-PDCCH), when the DL data is generated. In other words, the control signal region determination unit 2031 determines whether to arrange the DL control information (DCI) as the DL control signal 1a5 (corresponding to the PDCCH) or as the enhanced DL control signal 1a8 (corresponding to the E-PDCCH). The determination may be performed according to any rule. As an example, when there are a lot of vacant regions in the control signal region, it is possible to arrange the DL control signal 1a5a in the control signal region 1a3, and when there are few vacant regions in the control signal region 1a3, it is possible to arrange the enhanced DL control signal 1a8 in the enhanced control signal region 1a7.

When the control signal region determination unit 2031 determines to arrange the enhanced DL control signal 1a8 (corresponding to the E-PDCCH) in the enhanced control signal region 1a7, the subframe determination unit 2032 determines whether to set the DL subframe 1 for transmitting the DL data as the same DL subframe is as that of the enhanced DL control signal 1a8 (simultaneous transmission) or the subsequent DL subframe 1b to the enhanced DL control signal 1a8 (separate transmission). The determination may be performed according to any rule. As an example, if the size (for example, bit length or byte length) of the DL data is less than a predetermined value, the simultaneous transmission may be determined; whereas if the size is equal to or greater than the predetermined value, the separate transmission may be determined.

The resource determination unit 2033 determines a DL radio resource for transmitting the DL data to the wireless terminal 3 (performs a scheduling of the radio resource). At this time, the resource determination unit 2033 determines a radio resource for the data signal 16, in the same DL subframe 1 as that of the enhanced DL control signal 1a8 or the subsequent DL subframe 1, based on the determination of the subframe determination unit 2032. Since the determination of the DL radio resource conforms to a general scheme, the detailed description thereof will be omitted.

The scheduler unit 203 inputs a scheduling result including determinations respectively by the control signal region determination unit 2031, the subframe determination unit 2032, and the resource determination unit 2033 to the DL data signal coding and modulation unit 202, the DL control information generation unit 204, and the DL reference signal generation unit 206.

The DL control information generation unit 204 generates a DL control information based on the scheduling result which is input from the scheduler unit 203, and inputs the DL control information to the DL control signal coding and modulation unit 205. As an example, the DL control information generation unit 204 generates the DCI illustrated in FIG. 8, based on the input scheduling result. The DL control information generation unit 204 sets the value of RB allocation of DCI, based on the determination radio resource included in the scheduling result which is input from the scheduler unit 203. Further, the DL control information generation unit 204 sets the wireless terminal 3 identifier which is input from the scheduler in the value of the RNTI, and sets the modulation scheme and coding scheme in the value of the MCS. The DL control signal coding and modulation unit 205 codes and modulates the DL control information based on the modulation scheme and coding scheme which is instructed by the scheduler unit so as to generate the DL control information 1a5 or the enhanced DL control signal 1a8, and inputs the DL control signal 1a5 or the enhanced DL control signal 1a8 to the DL subframe generation unit 207.

The DL reference signal generation unit 206 generates a DL reference signal and inputs the DL reference signal to the DL subframe generation unit 207.

The DL subframe generation unit 207 arranges (also referred to as mapping) the coded and modulated DL data signal 16, the DL control signal 1a5 or the enhanced DL control signal 1a8 corresponding to the DL data signal 16, and the DL reference signal in the DL subframe 1 so as to generate the DL subframe 1. The DL data signal 16 is arranged in the DL subframe 1 so as to form a Physical Downlink Shared Channel (PDSCH). The DL control signal 1a5 is arranged in the DL subframe 1 so as to form a Physical Downlink Control Channel (PDCCH). The enhanced DL control signal 1a8 is arranged in the DL subframe 1 so as to form an Enhanced-Physical Downlink Control Channel (E-PDCCH). The DL reference signal is arranged in the DL subframe 1 based on a different pattern for each cell.

The DL subframe generation unit 207 performs a mapping of each DL signal, based on the scheduling result which is input from the scheduler unit 203. In other words, the DL subframe generation unit 207 performs a mapping of each signal in the radio resource (RB) determined in the scheduling result which is input from the scheduler unit 203.

The operation of the DL subframe generation unit 207 will be specifically described.

The DL subframe generation unit 207 performs a mapping of the DL data signal 16, and the enhanced DL control signal 1a8 corresponding to the DL data signal 16 in the following manner, based on the determination of the subframe determination unit 2032.

First, the process of the DL subframe generation unit 207 of a case where the subframe determination unit 2032 determines to transmit the enhanced DL control signal 1a8 corresponding to the DL data signal 1a6 in the same DL subframe 1 (same transmission) will be described. The DL subframe generation unit 207 arranges the enhanced DL control signal 1a8 corresponding to the DL data in the enhanced control signal region 1a7, in the N-th DL subframe 1a, based on the determination of the control signal region determination unit 2031. At this time, based on the determination (same transmission) of the subframe determination unit 2032, the DL subframe generation unit 207 arranges the enhanced DL control signal 1a8 in the DL subframe 1, according to the enhanced DL control signal arrangement rule in the case of simultaneous transmission. In the first embodiment, arranging the enhanced DL control signal 18 so as to be fitted in the first slot 11 of the enhanced control signal region 17 of the DL subframe 1 is the enhanced DL control signal arrangement rule in the case of the simultaneous transmission. Accordingly, the DL subframe generation unit 207 arranges the enhanced DL control signal 1a8 so as to be fitted in the first slot 1a1 of the enhanced control signal region 1a7 in the N-th DL subframe 1a.

When the subframe determination unit 2032 determines the simultaneous transmission, the DL subframe generation unit 207 arranges the DL data signal 1a6 corresponding to the enhanced DL control signal 1a8 which is arranged in advance, in the N-th DL subframe 1a, based on the determination of the resource determination unit 2033. Thus, it is assumed that the N-th DL subframe is includes the DL data signal 1a6 and the enhanced DL control signal 1a8 corresponding to the DL data signal 1a6.

Meanwhile, the process of the DL subframe generation unit 207 of a case where the subframe determination unit 2032 determines to transmit the enhanced DL control signal 1a8 corresponding to the DL data signal 16 in a different DL subframe 1 (separate transmission) will be described. The DL subframe generation unit 207 arranges the enhanced DL control signal 1a8 corresponding to the DL data in the enhanced control signal region 1a7, in the N-th DL subframe 1a, based on the determination of the control signal region determination unit 2031. At this time, based on the determination (separate transmission) of the subframe determination unit 2032, the DL subframe generation unit 207 arranges the enhanced DL control signal 1a8 in the N-th DL subframe 1a, according to the enhanced DL control signal arrangement rule in the case of simultaneous transmission. In the first embodiment, arranging the enhanced DL control signal 18 so as to be fitted in the second slot 12 of the enhanced control signal region 17 of the DL subframe 1 is the control signal arrangement rule in the case of the separate transmission. The DL subframe generation unit 207 arranges the enhanced DL control signal 1a8 so as to be fitted in the second slot 1a2 of the enhanced control signal region 1a7 in the N-th DL subframe 1a, based on the determination of the subframe determination unit 2032.

When the subframe determination unit 2032 determines the separate transmission, the DL subframe generation unit 207 does not arrange the DL data corresponding to the enhanced DL control signal 1a8 which is arranged in advance, in the N-th DL subframe 1a. Thus, it is assumed that the N-th DL subframe is does not include the DL data, but includes the enhanced DL control signal 1a8 corresponding to the DL data.

When the subframe determination unit 2032 determines the separate transmission, the DL subframe generation unit 207 arranges the DL data signal 1b6 corresponding to the enhanced DL control signal 1a8 which is arranged in advance, in the (N+1)-th DL subframe 1b, based on the determination of the resource determination unit 2033. Thus, it is assumed that the (N+1)-th DL subframe 1b includes the DL data signal 1b6 and does not include the enhanced DL control signal 1a8 corresponding to the DL data signal 1b6.

Further, when the control signal region determination unit 2031 determines to use the DL control signal 1a5, the subframe determination unit 2032 arranges the DL control signal 1a5 in the control signal region 1a3 in the N-th DL subframe 1a, and arranges the DL data signal 1a6 corresponding to the DL control signal 1a5 in the data signal region 1a4.

The DL subframe generation unit 207 inputs a baseband signal corresponding to the generated DL subframe 1 to the DL wireless transmission unit 113. The DL wireless transmission unit 208 up-converts the baseband signal corresponding to the input DL subframe 1 into a wireless signal by a frequency up-conversion or the like, and transmits the frequency-up-converted wireless signal to the wireless terminal 3 in a wireless manner.

The UL wireless reception unit 209 receives a UL wireless signal, converts the received wireless signal into a baseband signal corresponding to the UL subframe by e.g. frequency-down-converting the wireless signal, and outputs the baseband signal to the UL subframe analysis unit 210. As an example, the UL wireless reception unit 209 receives a UL wireless signal including acknowledgement information (ACK/NACK) corresponding to the transmitted DL data signal 16. The UL subframe analysis unit 210 extracts the UL data signal (PUSCH), the UL control signal (PUCCH), and the UL reference signal from the baseband signal corresponding to the UL subframe. The UL reference signal is used to demodulate the received UL signal and evaluate the quality and characteristic of UL radio link between the wireless terminal and the wireless base station. At this time, the UL subframe analysis unit 210 performs extraction of each signal, based on the UL scheduling information (information equivalent to RB allocation of DCI) which is input from the scheduler unit 203. Then, the UL subframe analysis unit 210 outputs the UL reference signal to the UL reference signal processing unit 211, outputs the UL control signal to the UL control signal demodulation and decoding unit 212, and outputs the UL data signal to the UL data signal demodulation and decoding unit 213.

The UL reference signal processing unit 211 processes the UL reference signal. Specifically, the UL reference signal processing unit 211 obtains UL channel characteristics based on a Demodulation Reference Signal (DM-RS) in the UL reference signal, and inputs the UL channel characteristics to the UL control signal demodulation and decoding unit 212 and the UL data signal demodulation and decoding unit 213. Further, the UL reference signal processing unit 211 obtains UL radio-link quality with respect to the wireless terminal 3, based on measurement on a received Sound reference signal (SRS) transmitted by the wireless terminal 3 which may be used in determination by the wireless base station of further scheduling of the wireless terminal 3, and inputs the UL radio-link quality to the scheduler unit 203.

The UL control signal demodulation and decoding unit 212 performs the demodulation and decoding of the received UL control signal. The UL control signal demodulation and decoding unit 212 performs the demodulation and decoding of the UL control signal, using the UL channel characteristics which are input from the UL reference signal processing unit 211, a predetermined modulation scheme, and an error correction coding scheme. The UL control signal demodulation and decoding unit 212 inputs the demodulated and decoded UL control information to the scheduler unit 203. An example of the UL control signal includes acknowledgement information (ACK/NACK signal) corresponding to the DL data received by the wireless terminal 3, UL scheduling request information, and the like.

The UL data signal demodulation and decoding unit 213 performs demodulation and decoding of the received UL data signal. The UL data signal demodulation and decoding unit 213 performs the demodulation and decoding of the UL data signal, using the UL channel characteristics which are input from the UL reference signal processing unit 211, the modulation scheme which is input from the scheduler unit 203, and an error correction coding scheme. The UL data signal demodulation and decoding unit 213 inputs the demodulated and decoded UL data information to the UL data processing unit and the like (not illustrated).

The transmission network transmission unit 214 may transfer the data signal and the control signal to different wireless base stations 2, other control devices, a relay device, and the like, through a backhaul network.

Figure 11:
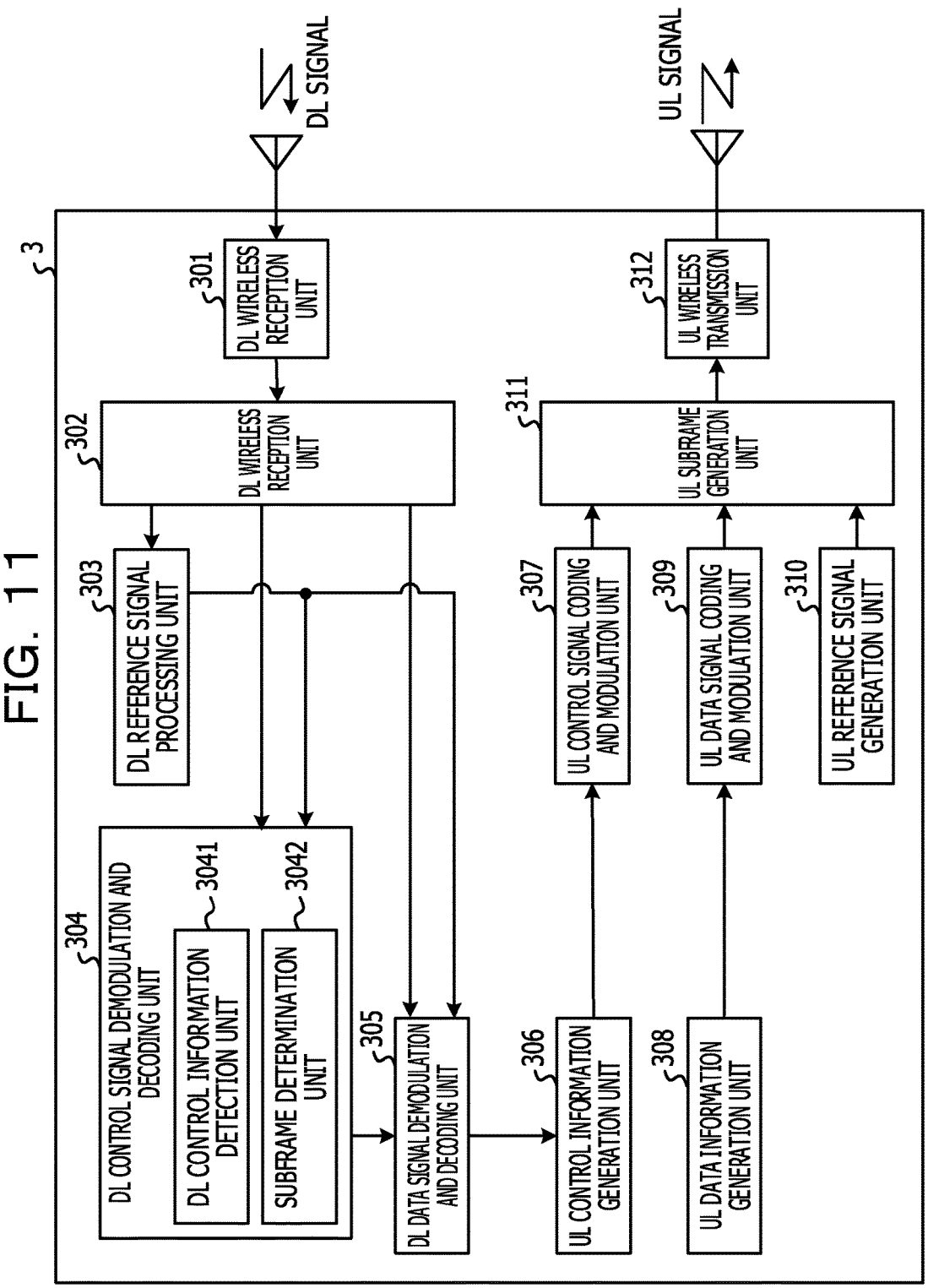
FIG. 11 is an example of a functional configuration diagram of a wireless terminal in the wireless communication system of the first embodiment.

FIG. 11 is a diagram illustrating an example of functional configurations of the wireless terminal 3 in the first embodiment. The wireless terminal 3 includes, for example, a DL wireless reception unit 301, a DL subframe analysis unit 302, a DL reference signal processing unit 303, a DL control signal demodulation and decoding unit 304, a DL data signal demodulation and decoding unit 305, a UL control information generation unit 306, a UL control signal coding and modulation unit 307, a UL data information generation unit 308, a UL data signal coding and modulation unit 309, a UL reference signal generation unit 310, a UL subframe generation unit 311, and a UL wireless transmission unit 312. Further, the DL control signal demodulation and decoding unit 304 includes a DL control information detection unit 3041, and a subframe determination unit 3042.

The DL wireless reception unit 301 receives a DL wireless signal, down-converts the received wireless signal into a baseband signal corresponding to the DL subframe 1 by a frequency conversion or the like, and outputs the baseband signal to the DL subframe analysis unit 302. The DL subframe analysis unit 302 extracts a control signal region 13, a data signal region 14, an enhanced control signal region 17, and a DL reference signal from the baseband signal corresponding to the DL subframe 1. Then, the DL subframe analysis unit 302 outputs the DL reference signal to the DL reference signal processing unit 303, outputs the control signal region 13 and the enhanced control signal region 17 to the DL control signal demodulation and decoding unit 304, and outputs the data signal region 14 to the DL data signal demodulation and decoding unit 305.

The DL reference signal processing unit 303 processes the DL reference signal. Specifically, the DL reference signal processing unit 303 estimates DL channel characteristics based on measurement on the DL reference signal, and respectively outputs the DL channel characteristics to the DL control signal demodulation and decoding unit 304, and the DL data signal demodulation and decoding unit 305.

The DL control signal demodulation and decoding unit 304 demodulates and decodes the DL control signals 15 and the enhanced DL control signals 18 in the control signal region 13 and the enhanced control signal region 17 of the DL subframe 1 so as to extract the DL control signal.

The DL control information detection unit 3041 demodulates and decodes the DL control signal 15 and the enhanced DL control signal 18 in the control signal region 13 and the enhanced control signal region 17 of the DL subframe 1, using DL channel characteristics, a predetermined demodulation scheme, and an error correction decoding scheme so as to detect DCI. If the DCI is detected, the DL control information detection unit 3041 recognizes (detects) the DCI addressed to the wireless terminal 3 based on the decoding result based on a CRC of a 16 bit length which is scrambled with the RNTI assigned to the wireless terminal 3. The DL control information detection unit 3041 recognizes (detects) whether the application object of the DCI is the UL data (PUSCH) or the DL data (PDSCH) based on the DCI format. The DL control information detection unit 3041 inputs the RB allocation and the MCS, which are included in the DCI, with respect to the DCI addressed to the wireless terminal 3, of which object is UL data, to the UL subframe generation unit 311. If the DCI addressed to the wireless terminal 3 for controlling DL data is detected, the DL control information detection unit 3041 inputs the detected DCI and information regarding arrangement of the DCI to the subframe determination unit.

The subframe determination unit 3042 determines whether the control object of the DL control information is the DL data signal 1a6 in the same DL subframe is or the DL data signal 1b6 in the subsequent DL subframe 1b, based on the arrangement of the detected DL control information (DCI) addressed to the wireless terminal 3. When the enhanced DL control signal 1a8 is arranged in the first slot 1a1 of the enhanced control signal region 1a7, the subframe determination unit 3042 in the first embodiment determines that the control object of the enhanced DL control signal 1a8 is the data signal 1a6 in the same subframe 1a. In other words, it is determined that the enhanced DL control signal 1a8 and the DL data signal 1a6 which is the control object of the enhanced DL control signal 1a8 are subjected to the simultaneous transmission of DL control signal and its associated DL data signal in the same subframe. Meanwhile, when the enhanced DL control signal 1a8 is arranged in the first slot 1a2 of the enhanced control signal region 1a7, the subframe determination unit 3042 determines that the control object of the enhanced DL control signal 1a8 is the DL data signal 1b6 in the subsequent subframe 1b. In other words, it is determined that the enhanced DL control signal 1a8 and the data signal 1b6 which is the control object of the enhanced DL control signal 1a8 are subjected to the separate transmission. The subframe determination unit 3042 inputs the determination result (the same subframe or the subsequent subframe) regarding the control object frame of the DCI, the RB allocation and the MCS which are included in the DCI to the DL data signal demodulation and decoding unit 305.

The DL data signal demodulation and decoding unit 305 demodulates the DL data signal 16 in the data signal region 14 of the DL subframe 1 and performs an error correction decoding so as to extract DL data information. One or more DL data signals 16 addressed to the wireless terminal 3 are multiplexed in the data signal region 14 of the DL subframe 1.

Here, the DL data signal demodulation and decoding unit 305 determines that the DL radio subframe 1 which is the application destination of the RB allocation and MCS which are input in the same manner, based on the determination result which is input from the subframe determination unit 3042. At this time, it is assumed that the DCI which is the basis of the input determination result is received in the N-th DL subframe 1a.

If the determination result of the subframe determination unit 3042 is "same subframe", the DL data signal demodulation and decoding unit 305 determines that the DL radio subframe which is the application destination of the RB allocation and MCS which are input is the DL data signal 1a6 in the same subframe (N-th DL subframe 1a). At this time, the DL data signal demodulation and decoding unit 305 extracts the DL data signal 1a6 from the data signal region 1a4 of the N-th DL subframe is which is input from the DL subframe analysis unit 302, based on the RB allocation, and performs the demodulation and decoding based on the MCS so as to extract the DL data information.

In contrast, if the determination result of the subframe determination unit 3042 is "subsequent subframe", the DL data signal demodulation and decoding unit 305 determines that the DL radio subframe 1 which is the application destination of the RB allocation and MCS which are input is the data signal 1b6 in the subsequent frame ((N+1)-th DL subframe 1b). At this time, the DL data signal demodulation and decoding unit 305 extracts the DL data signal 1b6 from the data signal region 1b4 of the (N+1)-th DL subframe 1b which is input from the DL subframe analysis unit 302, based on the RB allocation, and performs the demodulation and decoding based on the MCS so as to extract the DL data information.

The DL data signal demodulation and decoding unit 305 inputs a decoding result indicating whether or not the decoding has been successful (whether or not the decoding has finished without any error) to the UL control information generation unit 306. Acknowledgement information corresponding to the DL data is sent to the wireless base station 2. Further, the DL data signal demodulation and decoding unit 305 inputs the demodulated and decoded UL data information to the DL data processing unit, or the like (not illustrated).

The UL control information generation unit 306 generates the UL control signal, and inputs the UL control signal to the UL control signal coding and modulation unit 307. The UL control information generation unit 306 generates ACK information (indicating that decoding has been successful) or NACK information (indicating that decoding has failed) which is acknowledgement information, for example, based on the decoding result which is input from the DL data signal demodulation and decoding unit 305. The UL control signal coding and modulation unit 307 performs an error correction coding and a modulation on the UL control information which is input from the UL control information generation unit 306, based on a predetermined modulation scheme and a coding scheme, and inputs the UL control information to the UL subframe generation unit 311.

The UL data information generation unit 308 generates the UL data information, and inputs the UL data information to the UL data signal coding and modulation unit 309. The UL data signal coding and modulation unit 309 performs an error correction coding and modulation on the input UL data signal 1a6a, based on the MCS which is input from the DL control information detection unit 3041, and inputs the UL data signal to the UL subframe generation unit 311.

The UL reference information generation unit 310 generates UL reference information and inputs the UL reference information to the UL subframe generation unit 311. In the UL reference signal, as described above, there are a DeModulation Reference Signal (DM-RS) and a Sounding Reference Signal (SRS).

The UL subframe generation unit 311 arranges (mapping) the UL data signal, the UL control signal, and the UL reference signal in the UL frame so as to generate a UL subframe. The UL subframe generation unit 311 performs the mapping of the UL data signal, according to the RB allocation which is input from the DL control information detection unit 3041. Further, the UL subframe generation unit 311 maps the UL control signal which is input from the UL control signal coding and modulation unit to the UL subframe based on a predetermined rule. For example, the UL subframe generation unit 311 maps the acknowledgement signal which is input from the UL control signal coding and modulation unit to the UL subframe appearing four subframes after the DL subframe 1 in which the DL data signal 16 corresponding to the acknowledgement signal is received. Further, the UL subframe generation unit 311 maps the UL reference signal to the UL subframe based on a predetermined rule.

In addition, the UL subframe generation unit 311 may determine the UL radio resource to use for transmission of acknowledgement signal when the acknowledgement signal is transmitted in the UL subframe, using one of the following manners. For example, when assignment information of the UL radio resource is included in the N-th DL subframe, the UL subframe generation unit 311 may transmit the acknowledgement signal based on the assignment information. Further, when the assignment information of the UL radio resource is not included in the N-th DL subframe, for example, the UL subframe generation unit 311 may use a UL radio resource which is notified in advance by a control signal of a higher layer. As another example, when the assignment information of the UL radio resource is not included in the N-th DL subframe, the UL subframe generation unit 311 may determine the UL radio resource based on the DL radio resource used in transmission of the enhanced DL control signal included in the N-th DL subframe (can determine the UL radio resource in association with the identification number of Control Channel Element (CCE)).

The UL subframe generation unit 311 inputs the baseband signal corresponding to the generated UL subframe to the wireless transmission unit. The wireless transmission unit 312 up-converts the baseband signal corresponding to the input UL subframe into a wireless signal by a frequency up-conversion or the like, and transmits the wireless signal to the wireless base station 2 in a wireless manner.

According to the first embodiment described above, by the frame configuration illustrated in FIG. 5, the decoding delay of the enhanced DL control signal 1a8 can be shortened as compared to the related technology illustrated in FIG. 3. First, since the enhanced DL control signal 1a8a in the first slot 1a1 may be demodulated and decoded up to the completion of reception of the first slot 1a1, the demodulation and decoding of the data signal 1a6 in the same subframe may be started with a relatively small delay. Further, since the enhanced DL control signal 1a8b in the second slot 1a2 may be demodulated and decoded up to the completion of reception of the second slot 1a2, the demodulation and decoding of the data signal 1b6 in the subsequent subframe may be started without delay. Accordingly, since the delay for the start of demodulation and decoding of the DL data signal 16 is removed or sufficiently shortened, it is possible to resolve the aforementioned problem of retransmission control and the buffer.

[c] Second Embodiment

The first embodiment determines whether to set the location of the control object of the enhanced DL control signal 18 in the enhanced control signal region 17 to be the same frame or the subsequent frame, by the slot in which the enhanced DL control signal 18 is arranged. In other words, a boundary between two slots in the subframe is a reference line for separating the control object of the enhanced DL control signal 18. In contrast, a second embodiment is for describing an example in which the reference line for separating the control object of the enhanced DL control signal 18 is different from that in the first embodiment.

Based on FIG. 12 and FIG. 13, an example of a frame configuration in the second embodiment will be described.

Figure 12:
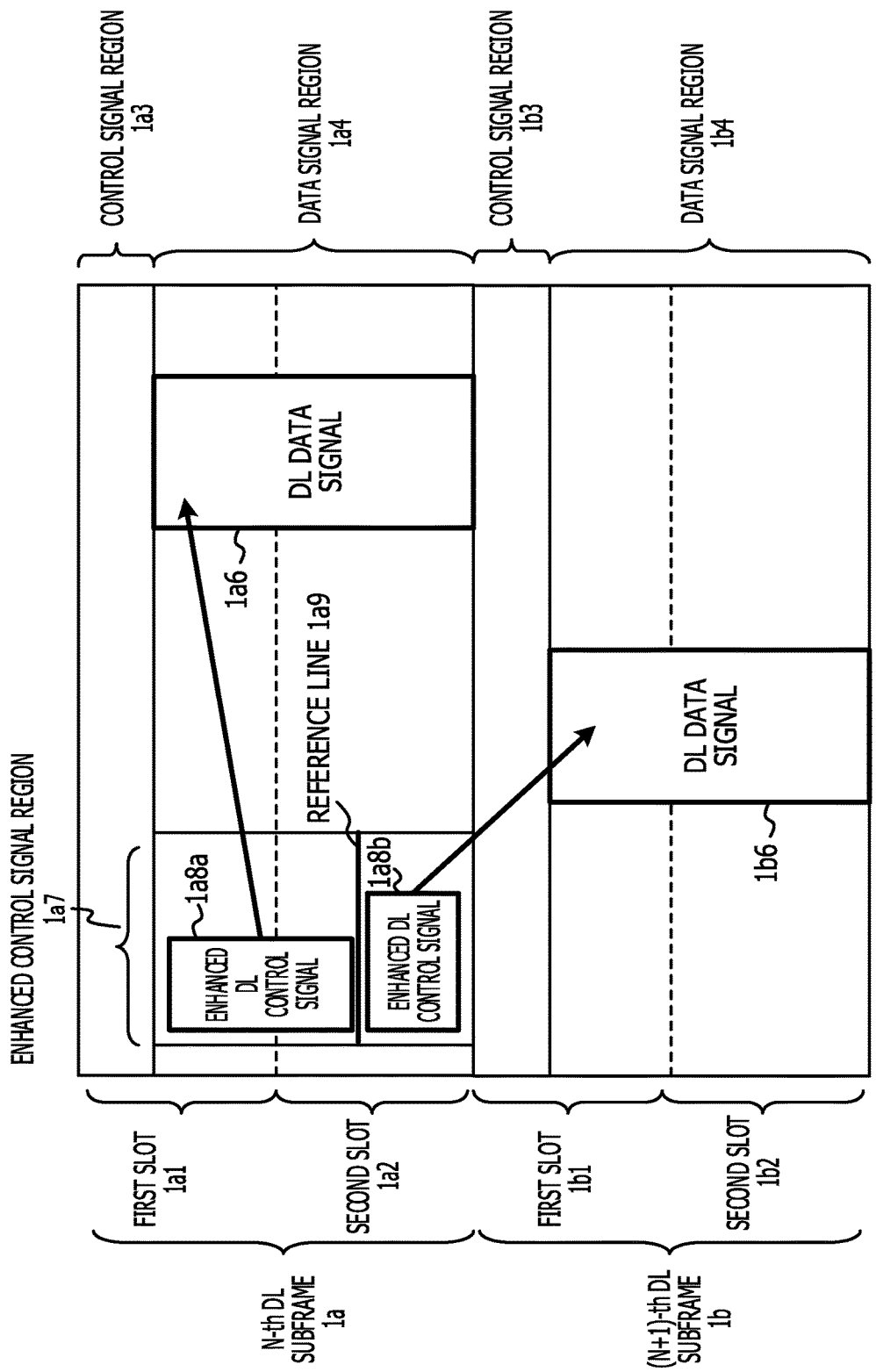
FIG. 12 is a diagram illustrating an example of a configuration of a DL subframe of a second embodiment.

FIG. 12 is a frame configuration example in which the control object of the enhanced DL control signal 1a8 is separated based on a reference line 1a9 which is set at a timing different from a slot boundary on a time axis. If the reference line is in a range of a data signal region 1a4, the reference line may be set at an arbitrary timing.

Figure 13:
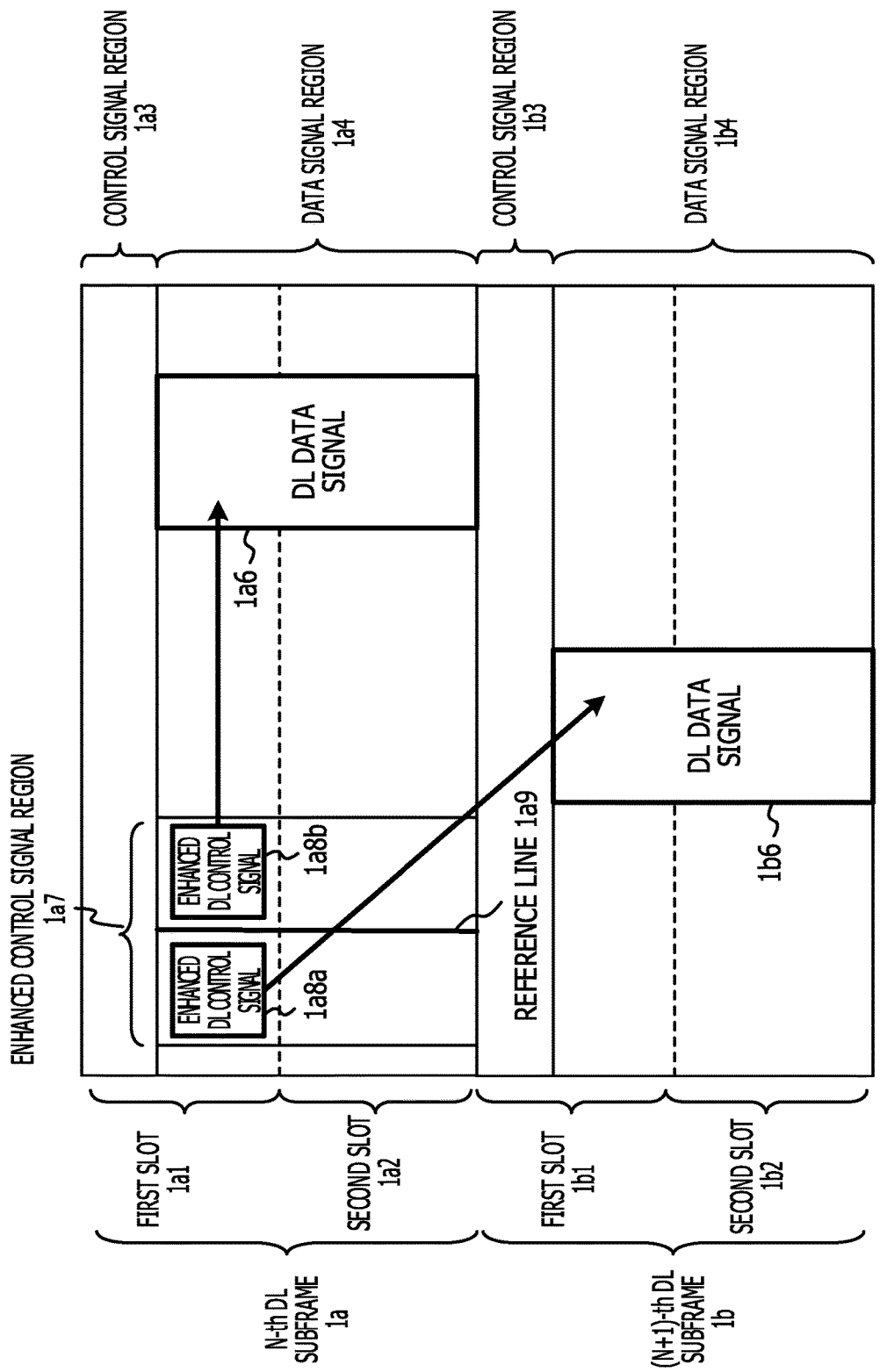
FIG. 13 is a diagram illustrating another example of a configuration of a DL subframe of the second embodiment.

FIG. 13 is a frame configuration example in which the control object of the enhanced DL control signal 1a8 is separated based on a reference line 1a9 which is set on a frequency axis. If the reference line is in a range of a data signal region 1a4, the reference line may be set at an arbitrary frequency. Here, particularly, in a case of FIG. 13, it is desirable that the size of the DL data signal 1a6 to be subjected to the simultaneous transmission together with the enhanced DL control signal 1a8 be small. In FIG. 13, the enhanced DL control signal 1a8 in a case of the simultaneous transmission may be arranged in a rear portion of a subframe (in the second slot 1a2 or across the second slot 1a2). This is because the effect of the delay for the start of the demodulation and decoding of the DL data signal 1a6 may become large, in a case where the size of the DL data signal 1a6 to be subjected to the simultaneous transmission together with the enhanced DL control signal 1a8 is large.

In addition, the reference line 1a9 may be determined in advance, or the wireless base station 2 may notify in advance the wireless terminal 3 of the reference line 1a9, using a control signal of a higher layer to be transmitted and received between the wireless base station 2 and the wireless terminal 3.

It is possible to achieve the same effect due to the same mechanism as that of the first embodiment also in the second embodiment.

Since the processing sequence and a functional configuration of each device in the second embodiment follow those of the first embodiment, the description thereof will be omitted.

[d] Third Embodiment

The first embodiment or the second embodiment determines whether to set the location of the control object of the enhanced DL control signal 18 in the enhanced control signal region 17 to be the same frame or the subsequent frame, based on the arrangement of the enhanced DL control signal 18 in the enhanced control signal region 17. In contrast, the third embodiment is set the location of the control object of the enhanced DL control signal 18 in the enhanced control signal region 17 to be the subsequent frame and set the location of the control object of the DL control signal 15 in the control signal region 13 to be the same frame. In other words, the control object is changed depending on the DL control information 15 or the enhanced DL control information 18.

Figure 14:
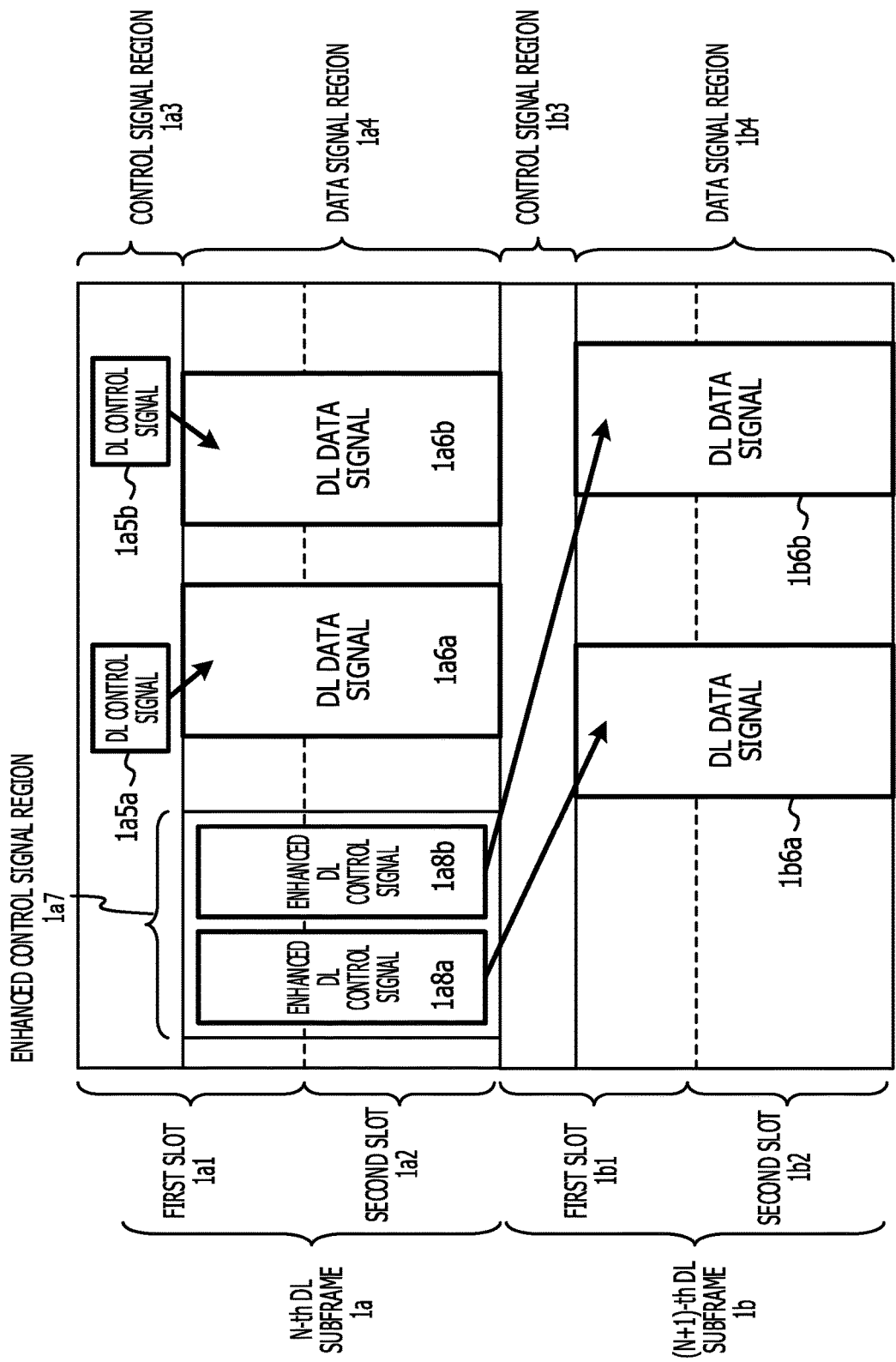
FIG. 14 is a diagram illustrating an example of a configuration of a DL subframe of a third embodiment.

An example of a frame configuration in the third embodiment will be described with reference to FIG. 14. In FIG. 14, two DL control signals 1a5a and 1a5b are arranged in a control signal region 1a3 in an N-th DL subframe 1a. Further, two enhanced DL control signals 1a8a and 1a8b are arranged in an enhanced control signal region 1a7 in the N-th DL subframe 1a. Then the respective control targets of the DL control signals 1a5a and 1a5b are control data signals 1a6a and 1a6b arranged in the N-th DL subframe 1a. In other words, the respective control targets of the DL control signals 1a5a and 1a5b are the DL data signals 1a6a and 1a6b in the same DL subframe is as the DL subframe is in which the DL control signals 1a5a and 1a5b are arranged. In contrast, the respective control targets of the enhanced DL control signals 1a8a and 1a8b are the data signals 1b6a and 1b6b arranged in the (N+1)-th DL subframe 1b. In other words, the respective control targets of the enhanced DL control signals 1a5a and 1a5b are the DL data signals 1a6a and 1a6b in the same DL subframe is as the DL subframe is in which the DL control signals 1a5a and 1a5b are arranged.

To summarize the above, the control target of the DL control signal 1a5 arranged in the control signal region 1a3 is the data signals 1a6 arranged in the same DL subframe is as the DL subframe is in which the DL control signals 1a5 are arranged. In contrast, the control target of the enhanced DL control signal 1a8 in the enhanced control signal region 1a7 is the data signals 1b6 arranged in the subsequent DL subframe 1b to the DL subframe is in which the enhanced DL control signal 1a8 is arranged. In other words, the control target is changed depending on the DL control information 15 or the enhanced DL control information 18.

It is possible to achieve the same effect due to the same mechanism as that of the first embodiment also in the second embodiment.

Since the processing sequence and a functional configuration of each device in the third embodiment follow those of the first embodiment, the description thereof will be omitted.

[e] Fourth Embodiment

The first, second and third embodiments determines whether to set the location of the control object of the enhanced DL control signal 18 (including the DL control signal 15 in the third embodiment) to be the same frame or the subsequent frame, based on the arrangement of the enhanced DL control signal 18 (including the DL control signal 15 in the third embodiment). In contrast, in the fourth embodiment, the control object of the enhanced DL control signal 18 is determined based on information regarding the data size included in the enhanced DL control signal 18.

The process in the fourth embodiment will be described while comparing FIG. 7 with FIG. 9 in the following description.

When the wireless base station 2 in the fourth embodiment determines whether to cause the DL data to be subjected to the same transmission as or the separate transmission from the enhanced DL control signal 1a8 (corresponding to S103 in FIG. 7 or S203 in FIG. 9), if the size (for example, bit length or byte length) of the DL data is less than a predetermined value (threshold value), the simultaneous transmission of DL control signal and its associated DL data signal in the same subframe is performed, whereas if the size is equal to or greater than the predetermined value, the separate transmission is performed. Although it is possible to use any determination reference as to whether to use the simultaneous transmission or the separate transmission in other embodiments, the determination is to be performed based on the data size in the fourth embodiment. It is possible to use a bit length or a byte length as a data size.

When the enhanced DL control signal 1a8 is transmitted in the enhanced control signal region 1a7 of the N-th DL subframe is (corresponding to S104 in FIG. 7 or S204 in FIG. 9), the wireless base station 2 of the fourth embodiment may arrange the enhanced DL control signal 1a8 in any position of the enhanced control signal region 1a7.

However, it is intended that the enhanced DL control signal 1a8 of the fourth embodiment include information regarding the size of the DL data. It is possible to use, for example, a signal obtained by coding and modulating the DL control information (DCI) illustrated in FIG. 7 as the enhanced DL control signal 1a8 of the fourth embodiment. In the DL control information of FIG. 7, the RB allocation and the MCS correspond to the information regarding the size of the DL data. Since it is possible to know the size (that is, the size of symbols) of a resource block from the RB allocation, and to know a modulation scheme (information amount for each one symbol) from the MCS, it is possible to obtain the size (a bit length or a byte length) of the DL data.

When the wireless terminal 3 of the fourth embodiment determines whether the control object of the enhanced DL control signal 1a8 detected in the enhanced control signal region 1a7 of the DL subframe is the same subframe or the subsequent subframe (corresponding to S106 or S206 of FIG. 7), the determination is performed based on the information regarding the size of the DL data included in the enhanced DL control signal 1a8. For example, the wireless terminal 3 obtains the size (a bit length or a byte length) of the DL data from the RB allocation and the MCS included in the DL control information obtained by demodulating and decoding the enhanced DL control signal 1a8 detected in the enhanced control signal region 1a7. Then, if the size of the DL data is less than a predetermined value (threshold value), the wireless terminal 3 determines that the control object of the enhanced DL control signal 1a8 is the DL data signal 1a6 in the same subframe (N-th DL subframe 1a). In contrast, if the size of the DL data is equal to or greater than the predetermined value, the wireless terminal 3 determines that the control object of the enhanced DL control signal 1a8 is the DL data signal 1b6 in the subsequent subframe ((N+1)-th DL subframe 1b).

In addition, here, it is assumed that a predetermined value (threshold value) used in the determination by the wireless terminal 3 and a predetermined value (threshold value) used when the wireless base station 2 determines whether to cause the DL data to be subjected to the simultaneous transmission as or the separate transmission from the enhanced DL control signal 1a8 are the same. For example, the wireless base station 2 may determine the predetermined value in advance and transmit the predetermined value to the wireless terminal 3 by a control signal of a higher layer. Further, when the predetermined value is 0, that is, 0 is notified to the terminal as the threshold value, with respect to the enhanced DL control signal 1a8 (E-PDCCH) to be transmitted and received from the wireless base station 2 to the wireless terminal 3, irrespective of the size of the corresponding to the DL data signal 16, the enhanced DL control signal 1a8 and the DL data signal 16 may be subjected to the simultaneous transmission (the simultaneous transmission is determined by the wireless terminal 3). Even in a case where the predetermined value is not set, with respect to the enhanced DL control signal 1a8 (E-PDCCH) to be transmitted and received from the wireless base station 2 to the wireless terminal 3, irrespective of the size of the corresponding to the DL data signal 16, the enhanced DL control signal 1a8 and the DL data signal 16 may be subjected to the simultaneous transmission (the simultaneous transmission is determined by the wireless terminal 3).

Figure 15:
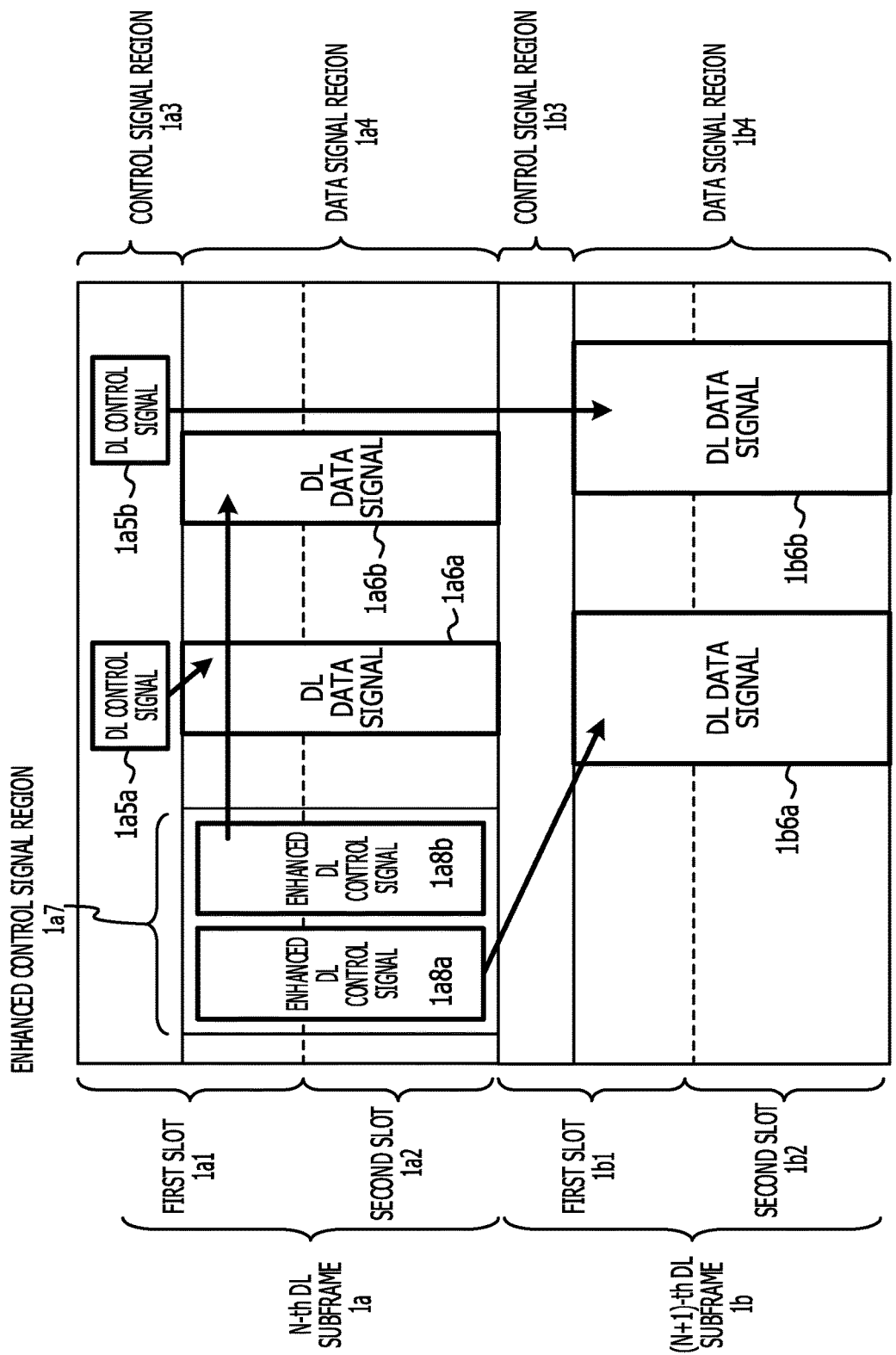
FIG. 15 is a diagram illustrating an example of a configuration of a DL subframe of a fourth embodiment.

In addition, the embodiment may be applied to the DL control signal 1a5 in the control signal region 1a3 in the related art, as well as to the enhanced DL control signal 1a8 in the enhanced control signal region 1a7, as illustrated in FIG. 15.

According to the fourth embodiment as described above, when the DL data, which is the control object of the enhanced DL control signal 18 in the enhanced control signal region 17, is greater in size than acceptable, the DL data is to be subjected to the separate transmission. Thus, the demodulation and decoding of the data of a large size may be started without delay. In contrast, if the size is smaller than acceptable, the DL data is to be subjected to the simultaneous transmission as the enhanced DL control signal 18, but even if the start of the demodulation and decoding is delayed slightly, the problem of retransmission control and the buffer as described above is small. Accordingly, even in the fourth embodiment, it is possible to achieve the same effect as the first embodiment.

Since the processing sequence and a functional configuration of each device in the fourth embodiment follow those of the first embodiment, the description thereof will be omitted.

[f] Fifth Embodiment

In the fifth embodiment, the control object of the enhanced DL control signal 18 is determined based on information included in the enhanced DL control signal 18, similar to the fourth embodiment. The control object is determined using the information regarding the data size in information included in the enhanced DL control signal 18 in the fourth embodiment, whereas the control object is determined based on information indicating the control object in the fifth embodiment.

The process in the fifth embodiment will be described while comparing FIG. 7 with FIG. 9 in the following description.

When the wireless base station 2 of the fifth embodiment transmits the enhanced DL control signal 1a8 in the enhanced control signal region 1a7 in the N-th DL subframe is (corresponding to S104 or S204 in FIG. 7), the enhanced DL control signal 1a8 may be arranged in any position of the enhanced control signal region 1a7.

However, it is assumed that the enhanced DL control signal 1a8 of the fifth embodiment includes information identifying the control object of the DL control signal (for example, information indicating that the control object is the same frame or the subsequent frame). It is possible to use for example, the signal obtained by coding and modulating the enhanced DL control information (DCI) illustrated in FIG. 16 as the enhanced DL control signal 1a8 of the fifth embodiment. In the DL control information of FIG. 16, "control object frame" corresponds to the information for identifying the control object of the DL control information. For example, it is possible to set the "control object frame" information as flag information of which a value changes depending on whether the control object is the same frame or the subsequent frame. Further, it is possible to set the "control object frame" information as a frame identifier of a frame (a serial number of a frame).

Then, when the wireless terminal 3 of the fifth embodiment determines whether the control object of the enhanced DL control signal 1a8 detected in the enhanced control signal region 1a7 of the N-th DL subframe is the same subframe or the subsequent subframe (corresponding to S106 or S206 of FIG. 7), the determination is performed based on the information for identifying the control object of the DL control information included in the DL control signal obtained by demodulating and decoding the enhanced DL control signal 1a8.

In addition, the embodiment may be applied to the DL control signal 1a5 in the control signal region 1a3 in the related art, as well as to the enhanced DL control signal 1a8 in the enhanced control signal region 1a7, similarly to the fourth embodiment.

It is possible to achieve the same effect due to the same mechanism as that of the first embodiment also in the fifth embodiment.

Since the processing sequence and a functional configuration of each device in the fifth embodiment follow those of the first embodiment, the description thereof will be omitted.

[g] Sixth Embodiment

A sixth embodiment is a modification example capable of being applied also to any one of the first embodiment to the fifth embodiment, and in which a resource allocation unit of the DL data signal 16 is increased more than a predetermined value in a case of transmitting the enhanced DL control signal 18 and the DL data signal 16 in a different DL subframe 1 (separate transmission).

A modification example in which the sixth embodiment is applied to the first embodiment will be described later. Since the modification example has many points common with the first embodiment, a description will be made focusing on the differences from the first embodiment later. In addition, as described above, the sixth embodiment may be applied to any one of the second embodiment to the fifth embodiment and be changed, but may be applied in the same manner as the first embodiment, such that the description thereof will be omitted.

Although a Resource Block (RB) in a LTE system has been described, here it will be described again. The RB is a unit of radio resources. Among data signal regions 14 of the DL subframe 1, one RB has for example, a frequency width of 12 subcarriers. In the LTE system, when the wireless base station 2 allocates the radio resource to the DL data, the minimum unit of the allocation of a frequency component is the RB. However, the wireless base station 2 may not allocate the radio resource in single RB units, but may allocate the radio resource in units of one to four RB units depending on the use frequency bandwidth. For example, when the use frequency bandwidth is 5 MHz, the wireless base station 2 allocates the radio resource in units of two RBs. Meanwhile, for example, when the use frequency bandwidth is 10 MHz, the wireless base station 2 allocates the radio resource in units of three RBs. A group of one to four RBs which is a resource allocation unit depending on such a use frequency bandwidth is referred to as a Resource Block Group (RBG), and the number of RBs included in the RBG is referred to as a RBG size. In general, the greater the use frequency bandwidth is, the RBG size is the same or greater.

However, in the first embodiment, a case where the enhanced DL control signal 18 and the DL data signal 16 are transmitted separately is considered. Here, as described above, it is possible to preferentially perform the separate transmission of the DL data signal 16 of a large size. This is for ensuring the processing time of the data demodulation and decoding up to the acknowledgement signal transmission. In this case, the data signal 16 transmitted separately from the enhanced DL control signal 18 is only a data signal 16 of a large size.

Here, if the size of the RBG is increased when there are many data signals 16 of a small size, there can be a problem in terms of the use efficiency of radio resource. When for example, all data is equal to or less than one RB, if the RBG size is four RBs, the DL data signal 16 is arranged only in 25% of the radio resource that is allocated at most. In contrast, even if the size of the RBG is increased when there are many DL data signals 16 of a large size, it is considered that there are few problems in terms of the use efficiency of the radio resource. When for example, all data is equal to or greater than 12 RBs, even if the RBG size is four RBs, the DL data signal 16 is arranged only in 75% of the radio resource that is allocated at a minimum. Accordingly, it is considered that there are few problems, even if the RBG size is increased for the DL data signal 16 which is transmitted separately.

Thus, it is assumed that the wireless base station 2 in the sixth embodiment sets the value of the RB allocation, based on the RBG size which is greater than as usual, for the enhanced DL control signal 18 transmitted separately from the DL data signal 16, that is, the enhanced DL control signal 1a8b arranged in the second slot 1a2 in the N-th DL subframe 1a. Further, the wireless terminal 3 also interprets the value of the RB allocation, based on the RBG size which is greater than as usual, for the enhanced DL control signal 1a8b arranged in the second slot 1a2 in the N-th DL subframe 1a, and extracts the data signal 1b6 in the (N+1)-th DL subframe 1b. Here, the RBG size which is greater than as usual may be a predetermined value, and may be determined (for example, one is added) based on the usual RBG size.

When the use frequency bandwidth is fixed, if the RBG size is increased, it is possible to reduce the size of the RB allocation (indicating the arrangement of the data signal 16) which is the parameter of DCI. Therefore, if the RBG size is increased, it is possible to suppress the size of the enhanced DL control signal 18 to being small.

According to the sixth embodiment, it is possible to achieve an effect of decreasing the size of the enhanced DL control signal 18, in addition to the effect achieved in the first embodiment.

Since the processing sequence and a functional configuration of each device in the sixth embodiment follow those of the first embodiment, the description thereof will be omitted.

[h] Seventh Embodiment

A seventh embodiment is a modification example capable of being applied also to any one of the first embodiment to the sixth embodiment, in which a distributed allocation is applied to a resource allocation unit of the DL data signal 16 in a case of transmitting the enhanced DL control signal 18 and the DL data signal 16 in a different DL subframe 1 (separate transmission).

A modification example in which the seventh embodiment is applied to the first embodiment will be described later. Since the modification example has many points common with the first embodiment, a description will be made focusing on the differences from the first embodiment later. In addition, as described above, the seventh embodiment may be applied to any one of the second embodiment to the sixth embodiment and be changed, but may be applied in the same manner as the first embodiment, such that the description thereof will be omitted.

As described above, the allocation of the radio resource in the LTE system is performed in units of the RBG size. The RBG size is determined depending on the use frequency bandwidth, and is one to four RBs in some cases. Therefore, the allocation of the radio resource may be performed in units of a plurality of (two to four) RBs in some cases.

Here, a case where the RBG size is four RBs as an example is considered. At this time, when four RBs included in one RBG are allocated to the radio resources, there are two schemes. One is allocating four RBs so as to be successive on the frequency axis, and is referred to as a localized allocation or localized transmission. Another is allocating four RBs so as to be discrete on the frequency axis, and is referred to as distributed allocation or distributed transmission. Although two schemes are defined as an allocation algorithm of RB, the detailed description will be omitted.

However, the scheduling of the radio resource is performed in units of subframes on the time axis. The wireless base station 2 receives a feedback of Channel Quality Indicator (CQI) for each subband configured with a plurality of consecutive RBs, from each wireless terminal 3 periodically or on demand. The wireless base station 2 is intended to allocate good-quality RBs to each wireless terminal 3 as much as possible, based on the CQI sent by each wireless terminal. Thus, maximizing the use efficiency of radio resource of the entire DL is intended.

However, the quality and characteristic of radio links between the wireless base station and each wireless terminal change as time goes by. Particularly, the change is significant when the wireless terminal 3 moves at a high speed. In such a case, there is a possibility that the reception quality of the frequency in the subsequent DL subframe 1b deteriorates, even if the reception quality of a certain frequency in a certain DL subframe is good.

A case where the enhanced DL control signal 18 and the data signal 16 are transmitted separately in the first embodiment, based on the above description of the LTE system is considered. In this case, the frequency (RB allocation) to which the data signal 1b6 transmitted in the (N+1)-th DL subframe is allocated is stored in the enhanced DL control signal 1a8b transmitted in the previous N-th DL subframe 1a. Therefore, when radio-link characteristics change significantly between the N-th DL subframe is for transmitting the enhanced DL control signal 1a8d and the (N+1)-th DL subframe 1b for transmitting the data signal 1a6a and the reception quality on the wireless terminal 3 side deteriorates, the data signal 1b6 is transmitted using a frequency of a bad reception quality. This becomes a problem in terms of radio transmission characteristics. This is because the probability of the wireless terminal 3 being successful in decoding of the data signal 1b6 decreases and the probability of re-transmission occurring increases, such that the possibility of the decrease in the throughput of the data transmission is increased.

In such a case, if the localized allocation described above is performed, transmission efficiency may be particularly problematic. In general, the reception quality of the wireless signal tends to be maintained on the frequency axis. Therefore, in a case of the localized allocation, it is considered that the reception quality of the RB included in the RBG tends to deteriorate. In contrast, in a case of distributed allocation, it is considered that the deterioration in the reception quality of the RB included in the RBG is small compared to the localized allocation. In addition, in a case of the distributed allocation, even if for example, the reception quality of the RB included in the RBG deteriorates, there may be a possibility of ensuring the reception quality of the entire RBG by the reception quality of another RB being improved. Usually, when transmission of a data signal is performed in a radio interval, the interleaving process on a bit sequence to be transmitted is performed, and a de-interleaving process on the receiving side is performed. Therefore, in the distributed transmission, even if the reception quality regarding a certain RB deteriorates and a signal which is mapped to the RB is subjected to characteristic deterioration significantly, a bit affected by the process of de-interleaving is diffused in the decoding process on the reception side. Since the turbo code used in the coding of the data signal has a high resistance with respect to random errors in which bits are dispersed erroneously, compatibility with the distributed transmission is good.

Thus, the wireless base station 2 of the seventh embodiment is intended to allocate the RB based on the distribution allocation described above, for the data signal 1*b*6 subjected to the separate transmission from the enhanced DL control signal 1*a*8*b*. Further, the wireless terminal 3 causes the enhanced DL control signal 1*a*8*b* subjected to the separate transmission from the data signal 1*b*6 (the enhanced DL control signal 1*a*8*b* arranged in the second slot 1*a*2 of the N-th DL subframe 1*a*) to follow the distributed allocation when the DL data signal 1*b*6 of the (N+1)-th DL subframe 1*b* is extracted based on the RB allocation which is a parameter of the DL control information obtained by demodulating and decoding the enhanced DL control signal 1*a*8*b*.

According to the seventh embodiment, it is possible to achieve an effect of suppressing the deterioration in the transmission characteristics due to changes in the radio-link quality, with respect to the data signal 16 subjected to the separate transmission as the enhanced DL control signal 18, in addition to the effect achieved in the first embodiment.

Since the processing sequence and a functional configuration of each device in the seventh embodiment follow those of the first embodiment, the description thereof will be omitted.

[i] Eighth Embodiment

An eighth embodiment is a modification example capable of being applied also to any one of the first embodiment to the seventh embodiment, in which the data signal 16 which is the control object of the enhanced DL control signal 18 in the enhanced control signal region 17 is modulated by a modulation scheme in which information to be transmitted is transmitted by using not only a phase component of a carrier but also an amplitude component, such as 16 QAM and 64 QAM, and includes information regarding transmission in the enhanced DL control signal 18 in the subsequent DL subframe 1 at a lower transmission power than normal.

A modification example in which the eighth embodiment is applied to the first embodiment will be described later. Since the modification example has many points common with the first embodiment, a description will be made focusing on the differences from the first embodiment later. In addition, as described above, the eighth embodiment may be applied to any one of the second embodiment to the seventh embodiment and be changed, but may be applied in the same manner as the first embodiment, such that the description thereof will be omitted.

In recent years, a so-called heterogeneous network in which a macro-cell which is a normal base station and a pico-cell or the like which is a small base station (a micro-cell, a femto-cell, and the like are similar) are mixed is considered. In the heterogeneous network, an effect of increasing the frequency use efficiency is expected by performing an efficient traffic offload between the macro-cell and the pico-cell and the like.

In general, the heterogeneous network has a cell deployed configuration in which the transmission power of the macro-cell is greater than that of the pico-cell and the pico-cell is present in one macro-cell coverage. Therefore, inter-cell interference from the macro-cell to the pico-cell is a problem. In order to alleviate this problem, Almost Blank Subframe (ABS) is introduced in Release 10 of 3GPP. In the ABS, only the transmission of the cell-specific common reference signals, synchronization signals and higher-level control signals is performed without performing the transmission of the DL data signals basically in the macro-cell. It is possible to suppress the interference from the macro-cell to the pico cell by the pico cell performing transmission of DL data signals, by using a time section in which ABS is configured in the DL on the macro-cell side. However, in ABS, the macro-cell is allowed to transmit the DL data at a sufficiently low transmission power. That is because if the transmission power is low enough, the interference from the macro-cell to the pico-cell may be limited. However, in the ABS, the macro-cell is to transmit the DL control signal 15. Here, since the normal control signal region 13 (corresponding to the PDCCH) is located across the entire DL transmission frequency band, even in the time section in which the ABS is set by the macro-cell, there is a possibility that an interference to the pico-cell by the DL control signal 15 in the control signal region 13 that is transmitted together with the DL data signal 16 transmitted at low transmission power on the macro-cell side is not ignored.

Thus, in the ABS, it is considered that the macro-cell transmits the enhanced DL control signal 18 (corresponding to the E-PDCCH) by not using the control signal region 13 (corresponding to the PDCCH) but using only the enhanced control signal region 17. Since only the frequency of a portion of the transmission frequency band is used for the enhanced control signal region 17, it is possible to avoid an interference to the DL data signal transmitted to the pico-cell by the enhanced DL control signal 18 (E-PDCCH) transmitted from the macro-cell, by determining for example, use restrictions in a data transmission region in the ABS section on the macro-cell side (a frequency of the RB to be used) between the macro-cell and the pico-cell.

Here, if the enhanced DL control signal 18 (E-PDCCH) is transmitted in the enhanced control signal region 17, as described in the location of a problem, and the like, problems of the retransmission control or the buffer based on the delay for the start of the demodulation and decoding of the DL data signal 16 occur. Therefore, even in a case where the enhanced DL control signal 18 is transmitted on the ABS, it is desirable to solve the problem by any one of the embodiments described above.

However, as described above, when the macro-cell transmits the DL data in the ABS, the transmission power is to be reduced. Here, if the modulation scheme of the DL data to be transmitted does not use an amplitude component in information transmission such as, for example, QPSK, a problem due to the change in the transmission power between subframes particularly does not occur. However, if the modulation scheme uses an amplitude component for information transmission, such as for example, 16 QAM and 64 QAM, there is a concern that the wireless terminal 3 may not appropriately perform the demodulation of data due to the change in the transmission power. In LTE, information regarding a transmission power ratio between the resource element used in the transmission of a data signal and the resource element used in the transmission of a reference signal for demodulation is notified to the terminal by using the control signal in the higher layer. The information is introduced by assuming application to the normal DL subframe 1 other than the ABS. The terminal may perform modulation by the information, even if the received DL data signal 16 is modulated by 16 QAM, 64 QAM, or the like. The power setting value of a case in which the macro-cell transmits the DL data signal 16 at low power in the ABS section changes depending where the terminal which receives the DL data signal 16 is positioned in the macro-cell. Although a determination method of a setting value may be based on an algorithm adopted by the communications company which operates the base station, when 16 QAM or 64 QAM is applied to the DL data signal 16, the terminal is to be informed of a new transmission power ratio, which is valid in the ABS, between the DL data signal 16 and the reference signal. If the power ratio which is valid in ABS also is notified to the terminal using the control signal in the higher layer, it is difficult to dynamically set the power depending on the position of each terminal for each ABS in the micro-cell.

Thus, for example, when the (N+1)-th DL subframe 1*b* is the ABS, in a case where the enhanced DL control signal 1*a*8 (corresponding to the E-PDCCH) is transmitted using the enhanced control signal region 1*a*7 in the N-th DL subframe is ahead of the ABS, and in a case where the object of the enhanced DL control signal 1*a*8 is the DL data signal 1*b*6 (PDSCH) in the subsequent frame (that is, the ABS), information regarding the transmission power of the data signal 1*b*6 is included in the enhanced DL control signal 1*a*8. Here, the information regarding the transmission power of the data signal 1*b*6 may be for example, a difference value between the normal DL subframe 1 and the ABS in a transmission power ratio between a DeModulation Reference Signal (DMRS) and the DL data signal 16. By doing so, even if the modulation scheme uses the amplitude component for information transmission such as for example, 16 QAM and 64 QAM, the wireless terminal 3 may know the changed transmission power. Accordingly, the wireless terminal 3 may appropriately perform the demodulation of the DL data signal 16.

According to the eighth embodiment, in addition to the effect achieved in the first embodiment, it is possible to achieve an effect that the data signal 16 which is the control object of the enhanced DL control signal 18 in the enhanced control signal region 17 is modulated by a modulation scheme in which information to be transmitted is transmitted by using not only a phase component of a carrier but also an amplitude component, and even if the data signal 16 is transmitted at a low transmission power in the subsequent subframe, the wireless terminal 3 performs the demodulation of the data signal 16.

[j] Other Embodiments

In the first to eighth embodiments described above, the DL data signal 16, which is transmitted separately from the enhanced DL control signal 18 and the like, is transmitted in the subsequent DL subframe 1 to the DL subframe 1 in which the enhanced DL control signal 18 and the like are transmitted. However, the DL subframe 1 in which the DL data signal 16 is transmitted is not limited to the subsequent DL subframe 1 to the DL subframe 1 in which the enhanced DL control signal 18 and the like are transmitted.

For example, the DL subframe 1 in which the DL data signal 16 is transmitted may be set as the DL subframe 1 appearing M DL subframes 1 after the DL subframe 1 in which the enhanced DL control signal 18 is transmitted (M is a positive integer). Further, depending on a situation, the value of M may be changed. For example, when the reception quality of the wireless terminal 3 is stable, M is set to a large value; when there is a significant change in the reception quality, M is set to a small value.

Further, in the first to eighth embodiments described above, the enhanced DL control signal 18 and the like and the DL data signal 16 may be transmitted in different DL subframes. Accordingly, the first to eighth embodiments are for DL transmission, but the present invention is not limited thereto.

For example, the present invention may be applied to UL transmission. Here, two schemes are considered to be an aspect which applies the present invention to the UL transmission. For example, the first one is applying the present invention to the UL transmission in a system in which the wireless base station 2 performs the determination (UL scheduling) of the data demodulation and decoding scheme of the UL transmission such as LTE. In other words, the UL data signal which is the control object of the enhanced DL control signal 18 in the enhanced control signal region 17 may be transmitted in the subsequent UL subframe to the UL subframe in which UL data signal is transmitted in a normal case. That is, in LTE, the UL data signal is transmitted in the UL subframe appearing four DL subframes 1 after the DL subframe 1 in which the enhanced DL control signal 18 (a signal obtained by coding and modulating DCI) used in the transmission control of the UL data signal is transmitted, but the UL data signal may be transmitted in the UL subframe not appearing four DL subframes 1 after but five or more after DL subframes 1.

Further, the second of the aspects which applies the present invention to the UL transmission may apply the present invention to the UL transmission in a system in which the wireless terminal 3 performs the determination (UL scheduling) of the data demodulation and decoding scheme of data of the UL transmission. In other words, the enhanced UL control signal and the like and the UL data signal may be transmitted on separate UL subframes.

The aspect may be implemented by exchanging the wireless terminal 3 and the wireless base station 2 in the embodiment which has been described hitherto. Further, the present invention may be applied to flat data transmission (there is no distinction of DL/UL) such as ad-hoc communication.

Finally, a hardware configuration of each device in the wireless communication system of each of the above embodiments will be described based on FIG. 17 and FIG.

18. In addition, the following example is assumed to be a Frequency Division Duplex (FDD) system, but it is needless to say that the following example may be applied to a Time Division Duplex (TDD) system or the like.

Figure 17:
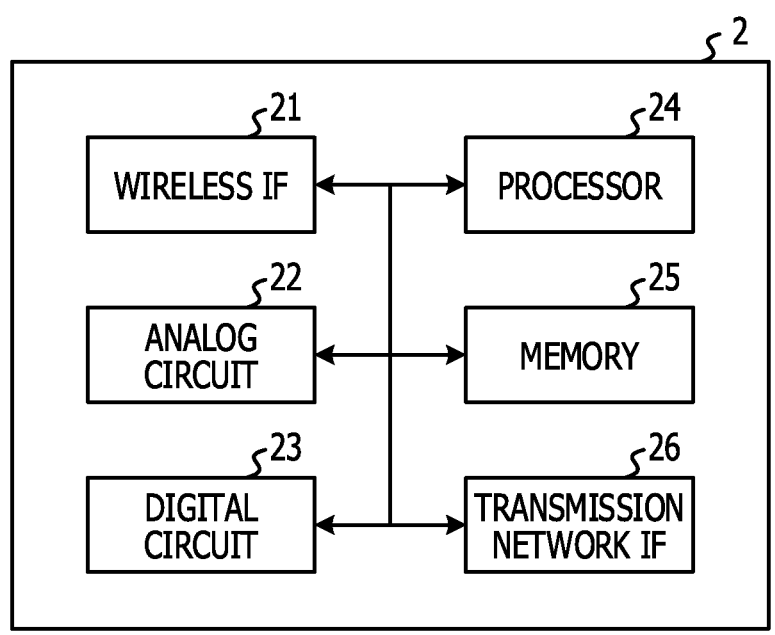
FIG. 17 is an example of a hardware configuration diagram of a wireless base station in a wireless communication system of each embodiment.

FIG. 17 describes an example of a hardware configuration of the wireless base station 2 of each of the above embodiments. Each function of the wireless base station 2 described above is implemented by some or all of the following hardware components. The wireless base station 2 in the above embodiments is configured with a wireless interface (IF) 21, an analog circuit 22, a digital circuit 23, a processor 24, a memory 25, a transmission network IF 26, and the like.

The wireless IF 21 is an interface device for performing wireless communication with the wireless terminal 3, and is for example, an antenna. The analog circuit 22 is a circuit which processes an analog signal, and may be roughly divided into that which performs a reception process, that which performs a transmission process, and that which performs other processes. The analog circuit 22 which performs the reception process includes for example, a Low Noise Amplifier (LNA), a Band Pass Filter (BPF), a Mixer, a Low Pass Filter (LPF), an Automatic Gain Controller (AGC), an Analog-to-Digital Converter (ADC), a Phase Locked Loop (PLL), and the like. The analog circuit 22 which performs the transmission process includes for example, a Power Amplifier (PA), a BPF, a mixer, a LPF, a Digital-to-Analog Converter (DAC), a PLL, and the like. The analog circuit 22 which performs other processes includes a Duplexer and the like. The digital circuit 23 is a circuit which processes a digital signal, and includes for example, a Large Scale Integration (LSI), a Field-Programming Gate Array (FPGA), an Application Specific Integrated Circuit (ASIC), and the like. The processor 24 is a device which processes data, and includes for example, a Central Processing Unit (CPU), a Digital Signal Processor (DSP), and the like. The memory 25 is a device which stores data, and includes for example, a Read Only Memory (ROM), a Random Access Memory (RAM), and the like. The transmission network IF 26 is connected to the backhaul network of the wireless communication system by a wired line or a wireless line, and is an interface device for performing wired communication or wireless communication with the device on the transmission network side including another wireless base station 2 connected to the backhaul network and the core network.

A corresponding relationship between the functional configuration and the hardware configuration of the wireless base station 2 will be described.

The DL data information generation unit 201 is implemented by, for example, the processor 24, the memory 25, and the digital circuit 23. In other words, the processor 24 controls the memory 25 depending on a situation, cooperates with the digital circuit 23 depending on a situation, and generates the DL data information. Further, the digital circuit 23 may generate the DL data information. The DL data signal coding and modulation unit 202 is implemented by, for example, the processor 24, the memory 25, and the digital circuit 23. In other words, the processor 24 controls the memory 25 depending on a situation, cooperates with the digital circuit 23 depending on a situation, and codes and modulates the DL data information so as to obtain the DL data signal 16. Further, digital circuit 23 may code and modulate the DL data information so as to obtain the DL data signal 16.

The scheduler unit 203 is implemented by, for example, the processor 24, the memory 25, and the digital circuit 23. In other words, the processor 24 controls the memory 25 depending on a situation, cooperates with the digital circuit 23 depending on a situation, performs a scheduling of a radio resource used in wireless communication and performs various control operations accompanying the scheduling of the radio resource. Further, the digital circuit 23 may perform the scheduling of the radio resource used in wireless communication and perform various control operations accompanying the scheduling of the radio resource. The control signal region determination unit 2031 is implemented by, for example, the processor 24, the memory 25, and the digital circuit 23. In other words, the processor 24 controls the memory 25 depending on a situation, cooperates with the digital circuit 23 depending on a situation, and determines whether to arrange the DL control signal 15 used in transmission of DL data in the control signal region 13 or to arrange the enhanced DL control signal 18 in the enhanced control signal region 17. Further, the digital circuit 23 may determine whether to arrange the DL control signal 15 used in transmission of DL data in the control signal region 13 or to arrange the enhanced DL control signal 18 in the enhanced control signal region 17. The subframe determination unit 2032 is implemented by, for example, the processor 24, the memory 25, and the digital circuit 23. In other words, the processor 24 controls the memory 25 depending on a situation, cooperates with the digital circuit 23 depending on a situation, and determines whether to set the DL subframe 1 in which the DL data signal 16 is transmitted as the same DL subframe 1 as that of the enhanced DL control signal 18 (same transmission) or as the subsequent DL subframe 1 to that of the enhanced DL control signal 18 (separate transmission). Further, the digital circuit 23 may determine whether to set the DL subframe 1 in which the DL data signal 16 is transmitted as the same DL subframe 1 as that of the enhanced DL control signal 18 (same transmission) or as the subsequent DL subframe 1 to that of the enhanced DL control signal 18 (separate transmission). The resource determination unit 2033 is implemented by, for example, the processor 24, the memory 25, and the digital circuit 23. In other words, the processor 24 controls the memory 25 depending on a situation, cooperates with the digital circuit 23 depending on a situation, and determines a DL radio resource for transmitting DL data to the wireless terminal 3. Further, the digital circuit 23 may determine the DL radio resource for transmitting DL data to the wireless terminal 3.

The DL control information generation unit 204 is implemented by, for example, the processor 24, the memory 25, and the digital circuit 23. In other words, the processor 24 controls the memory 25 depending on a situation, cooperates with the digital circuit 23 depending on a situation, and generates a DL control information. Further, the digital circuit 23 may generate the DL control information. The DL control signal coding and modulation unit 205 is implemented by, for example, the processor 24, the memory 25, and the digital circuit 23. In other words, the processor 24 controls the memory 25 depending on a situation, cooperates with the digital circuit 23 depending on a situation, and codes and modulates the DL control information so as to generate the enhanced DL control signal 18. Further, the digital circuit 23 may code and modulate the DL control information so as to generate the enhanced DL control signal 18.

The DL reference signal generation unit 206 is implemented by, for example, the processor 24, the memory 25, and the digital circuit 23. In other words, the processor 24 controls the memory 25 depending on a situation, cooperates with the digital circuit 23 depending on a situation, and generates the DL reference signal. Further, the digital circuit 23 may generate the DL reference signal. The DL subframe generation unit 207 is implemented by, for example, the processor 24, the memory 25, and the digital circuit 23. In other words, the processor 24 controls the memory 25 depending on a situation, cooperates with the digital circuit 23 depending on a situation, and arranges the DL data signal 16 subjected to the coding and modulation, the enhanced DL control signal 18 or the DL control signal 15, and the DL reference signal in the DL subframe 1 so as to generate the DL subframe 1. Further, the digital circuit 23 may arrange the DL data signal 16 subjected to the coding and modulation, the enhanced DL control signal 18 or the DL control signal 15, and the DL reference signal in the DL subframe 1 so as to generate the DL subframe 1.

The DL wireless transmission unit 208 is implemented by, for example, the wireless IF 21, and the analog circuit 22 (which perform the transmission process). In other words, the analog circuit 22 up-converts a baseband signal corresponding to the input DL subframe 1 into a wireless signal by a frequency conversion or the like, and the wireless IF 21 transmits the wireless signal to wireless terminal 3 in a wireless manner. The UL wireless reception unit 209 is implemented by, for example, the wireless IF 21 and the analog circuit 22 (which perform the reception process). In other words, the wireless IF 21 receives the UL wireless signal from the wireless terminal 3, and the analog circuit 22 down-converts the received wireless signal into a baseband signal corresponding to the UL subframe by the frequency conversion or the like. In addition, the DL wireless transmission unit 208 and the UL wireless reception unit 209 are implemented by different wireless IFs 21 (antenna), but one wireless IF 21 may be shared by the duplexer which is the analog circuit 22.

The UL subframe analysis unit 210 is implemented by, for example, the processor 24, the memory 25, the digital circuit 23. In other words, the processor 24 controls the memory 25 depending on a situation, cooperates with the digital circuit 23 depending on a situation, and extracts a UL data signal, a UL control signal and a UL reference signal from the baseband signal corresponding to the UL subframe. Further, the digital circuit 23 may extract the UL data signal, the UL control signal and the UL reference signal from the baseband signal corresponding to the UL subframe. The UL reference signal processing unit 211 is implemented by, for example, the processor 24, the memory 25, the digital circuit 23. In other words, the processor 24 controls the memory 25 depending on a situation, cooperates with the digital circuit 23 depending on a situation, and processes the UL reference signal. Further, the digital circuit 23 may process the UL reference signal. The UL control signal demodulation and decoding unit 212 is implemented by, for example, the processor 24, the memory 25, and the digital circuit 23. In other words, the processor 24 controls the memory 25 depending on a situation, cooperates with the digital circuit 23 depending on a situation, and demodulates the UL control signal so as to perform the error correction decoding. Further, the digital circuit 23 and the UL control signal demodulation and decoding unit 212 may demodulate the UL control signal so as to perform the error correction decoding. The UL data signal demodulation and decoding unit 213 is implemented by, for example, the processor 24, the memory 25, and the digital circuit 23. In other words, the processor 24 controls the memory 25 depending on a situation, cooperates with the digital circuit 23 depending on a situation, and performs the demodulation and decoding of the UL data signal. Further, the digital circuit 23 may perform the demodulation and decoding of the UL data signal.

The transmission network communication unit 214 is implemented by, for example, the transmission network IF 26, the analog circuit 22, the processor 24, the memory 25, and the digital circuit 23. In other words, the processor 24 controls the memory 25 depending on a situation, cooperates with the digital circuit 23 depending on a situation, and converts the data signal to be transmitted and the control signal into a digital baseband signal. Further, the analog circuit 22 converts the digital baseband signal into a wired signal or a wireless signal, and the transmission network IF 26 transmits the wired signal or the wireless signal. Further, the transmission network IF 26 receives the wired signal or the wireless signal, and the analog circuit 22 converts the wired signal or the wireless signal into the digital baseband signal. Further, the processor 24 controls the memory 25 depending on a situation, cooperates with the digital circuit 23 depending on a situation, and converts the digital baseband signal into a data signal or a control signal.

Figure 18:
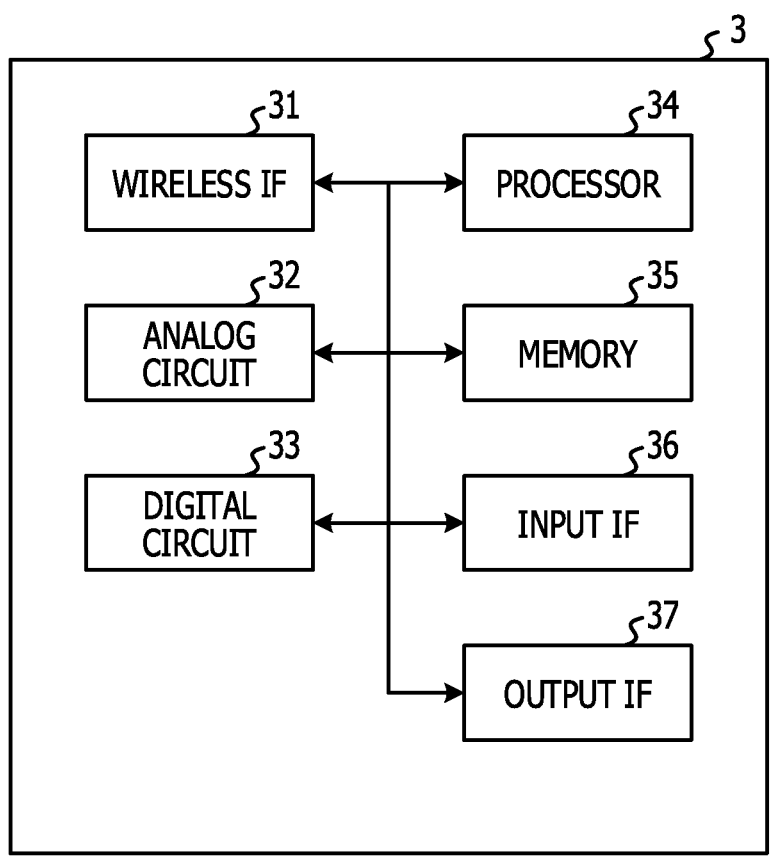
FIG. 18 is an example of a hardware configuration diagram of a wireless terminal in a wireless communication system of each embodiment.

FIG. 18 describes an example of a hardware configuration of the wireless terminal 3 of each of the above embodiments. Each function of the wireless terminal 3 described above is implemented by some or all of the following hardware components. The wireless terminal 3 in the above embodiments includes a wireless IF 31, an analog circuit 32, a digital circuit 33, a processor 34, a memory 35, an input IF 36, an output IF 37, and the like.

The wireless IF 31 is an interface device for performing wireless communication with the wireless base station 2, and is for example, an antenna. The analog circuit 32 is a circuit which processes an analog signal, and may be roughly divided into that which performs a reception process, that which performs a transmission process, and that which performs other processes. The analog circuit 32 which performs the reception process includes for example, a LNA, a BPF, a mixer, a LPF, an AGC, an ADC, a PLL, and the like. The analog circuit 32 which performs the transmission process includes for example, a PA, a BPF, a mixer, a LPF, a DAC, a PLL, and the like. The analog circuit 32 which performs other processes includes a Duplexer and the like. The digital circuit 33 includes for example, a LSI, a FPGA, an ASIC, and the like. The processor 34 is a device which processes data, and includes for example, a CPU, a DSP, and the like. The memory 35 is a device which stores data, and includes for example, a ROM, a RAM, and the like. The input IF 36 is a device which performs an input, including for example, an operation button, a microphone, and the like. The output IF 37 is a device which performs an output, and includes for example, a display, a speaker, and the like.

A corresponding relationship between the functional configuration and the hardware configuration of the wireless terminal 3 will be described.

The DL wireless reception unit 301 is implemented by, for example, the wireless IF 31, and the analog circuit 32 (which performs the reception process). In other words, the wireless IF 31 receives the DL wireless signal from the wireless base station 2, and the analog circuit 32 down-converts the received wireless signal into a baseband signal corresponding to the DL subframe by the frequency conversion or the like.

The DL subframe analysis unit 302 is implemented by for example, the processor 34, the memory 35, and the digital circuit 33. In other words, the processor 34 controls the memory 35 depending on a situation, cooperates with the digital circuit 33 depending on a situation, and extracts the data signal region 14, the control signal region 13, the enhanced control signal region 17, and the DL reference signal from the baseband signal corresponding to the DL subframe 1. Further, the digital circuit 33 may extract the data signal region 14, the control signal region 13, the enhanced control signal region 17, and the DL reference signal from the baseband signal corresponding to the DL subframe 1. The DL reference signal processing unit 303 is implemented by for example, the processor 34, the memory 35, and the digital circuit 33. In other words, the processor 34 controls the memory 35 depending on a situation, cooperates with the digital circuit 33 depending on a situation, and processes the DL reference signal. Further, the digital circuit 33 may process the DL reference signal.

The DL control signal demodulation and decoding unit 304 is implemented by for example, the processor 34, the memory 35, and the digital circuit 33. In other words, the processor 34 controls the memory 35 depending on a situation, cooperates with the digital circuit 33 depending on a situation, and extracts the DL control signal by demodulating the DL control signal 15 or the enhanced DL control signal 18 from the control signal region 13 and the enhanced control signal region 17 of the DL subframe 1 so as to perform an error correction decoding. Further, the digital circuit 33 may extract the DL control signal by demodulating the DL control signal 15 or the enhanced DL control signal 18 from the control signal region 13 and the enhanced control signal region 17 of the DL subframe 1 so as to perform an error correction decoding. The DL control information detection unit 3041 is implemented by for example, the processor 34, the memory 35, and the digital circuit 33. In other words, the processor 34 controls the memory 35 depending on a situation, cooperates with the digital circuit 33 depending on a situation, and detects DCI which is a DL control signal. Further, the digital circuit 33 may detect DCI which is a DL control signal. The subframe determination unit 3042 is implemented by for example, the processor 34, the memory 35, and the digital circuit 33. In other words, the processor 34 controls the memory 35 depending on a situation, cooperates with the digital circuit 33 depending on a situation, and determines whether the control object of the DL control information is the DL data signal 16 of the same DL subframe 1 or the DL data signal 16 of the subsequent DL subframe 1, based on the arrangement of the detected DCI addressed to the wireless terminal 3. Further, the digital circuit 33 may determine whether the control object of the DL control information is the DL data signal 16 of the same DL subframe 1 or the DL data signal 16 of the subsequent DL subframe 1, based on the arrangement of the detected DCI addressed to the wireless terminal 3. The DL data signal demodulation and decoding unit 305 is implemented by for example, the processor 34, the memory 35, and the digital circuit 33. In other words, the processor 34 controls the memory 35 depending on a situation, cooperates with the digital circuit 33 depending on a situation, and extracts the DL data information by demodulating the DL data signal 16 from the data signal region 14 of the DL subframe 1 so as to perform an error correction decoding. Further, the digital circuit 33 may extract the DL data information by demodulating the DL data signal 16 from the data signal region 14 of the DL subframe 1 so as to perform an error correction decoding.

The UL control information generation unit 306 is implemented by for example, the processor 34, the memory 35, and the digital circuit 33. In other words, the processor 34 controls the memory 35 depending on a situation, cooperates with the digital circuit 33 depending on a situation, and generates the UL control information. Further, the digital circuit 33 may generate the UL control information. The UL control signal coding and modulation unit 307 is implemented by for example, the processor 34, the memory 35, and the digital circuit 33. In other words, the processor 34 controls the memory 35 depending on a situation, cooperates with the digital circuit 33 depending on a situation, and performs an error correction coding and a modulation on the UL control information based on a predetermined modulation scheme and coding scheme. Further, the digital circuit 33 may perform an error correction coding and a modulation on the UL control information based on a predetermined modulation scheme and coding scheme. The UL data information generation unit 308 is implemented by for example, the processor 34, the memory 35, and the digital circuit 33. In other words, the processor 34 controls the memory 35 depending on a situation, cooperates with the digital circuit 33 depending on a situation, and generates the UL data information. Further, the digital circuit 33 may generate the UL data information. The UL data signal coding and modulation unit 309 is implemented by for example, the processor 34, the memory 35, and the digital circuit 33. In other words, the processor 34 controls the memory 35 depending on a situation, cooperates with the digital circuit 33 depending on a situation, and performs an error correction coding and modulation on the UL data signal based on the MCS. Further, the digital circuit 33 may perform the error correction coding and modulation on the UL data signal based on the MCS. The UL reference signal generation unit 310 is implemented by for example, the processor 34, the memory 35, and the digital circuit 33. In other words, the processor 34 controls the memory 35 depending on a situation, cooperates with the digital circuit 33 depending on a situation, and generates UL reference information. Further, the digital circuit 33 may generate the UL reference information. The UL subframe generation unit 311 is implemented by for example, the processor 34, the memory 35, and the digital circuit 33. In other words, the processor 34 controls the memory 35 depending on a situation, cooperates with the digital circuit 33 depending on a situation, and arranges the UL data signal, the UL control signal, and the UL reference signal in the UL subframe so as to generate a UL subframe. Further, the digital circuit 33 may arrange the UL data signal, the UL control signal, and the UL reference signal in the UL subframe so as to generate a UL subframe.

The UL wireless transmission unit 312 is implemented by, for example, the wireless IF 31, and the analog circuit 32 (which performs the transmission process). In other words, the analog circuit 32 up-converts a baseband signal corresponding to the input UL subframe 1 into a wireless signal by a frequency conversion or the like, and the wireless IF 31 transmits the wireless signal to wireless base station 2 in a wireless manner. In addition, the UL wireless transmission unit 312 and the DL wireless reception unit 301 may be implemented by different wireless IFs 31 (antenna), but one wireless IF 31 may be shared by using the Duplexer which is the analog circuit 32.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system in which a first wireless station transmits a radio signal including a plurality of radio frames sequentially to a second wireless station, at least one of the plurality of radio frames configured to include a control region and a data region, the control region including control information, the control information including information for coding associated data information, the wireless communication system comprising:

the first wireless station configured
to transmit a first radio frame of the radio signal to the second wireless station, the first radio frame including region information defining a partition between a first region and a second region of at least a second radio frame of the plurality of radio frames, the first region and the second region included in the data region, the first region appearing earlier in time direction than the second region in the at least one of the plurality of radio frames, wherein the control information is mapped into the first region of the second radio frame when the control information and the data information corresponding to the control information are scheduled for transmission in the second radio frame of the plurality of radio frames, and wherein the control information is mapped into the second region of the second radio frame when the control information is scheduled for transmission in the second radio frame preceding a third radio frame of the plurality of radio frames that is subsequent to the second radio frame and that includes the data information corresponding to the control information,
to encode the data information corresponding to the control information in accordance with the control information, and
to transmit the second radio frame of the plurality of radio frames of the radio signal to the second wireless station, wherein the second radio frame includes the control information and the encoded data information corresponding to the control information when the control information is mapped within the first region of the second frame, and wherein the second radio frame includes the control information in the second region of the second radio frame transmitted prior to the third radio frame that includes the encoded data information corresponding to the control information that is mapped into the control information in the second region of the second radio frame; and the second wireless station configured
to receive the first radio frame that includes the region information from the first wireless station,
to receive the second radio frame that includes the control information from the first wireless station,
to determine whether the received control information is mapped within the first region of the second radio frame or in the second region of the second radio frame based on the received region information, and
to decode the encoded data information received from the first wireless station in accordance with the received control information, the encoded data information being obtained from the received second radio frame that includes the received control information mapped within the first region of the second radio frame, and the encoded data information obtained from the third radio frame, which is received subsequent to the second radio frame that includes the received control information mapped in the second region of the second radio frame.

2. The wireless communication system according to claim 1, wherein the control information is E-PDCCH of an LTE system.

3. The wireless communication system according to claim 1, wherein the plurality of radio frames is a plurality of subframes of an LTE system.

4. The wireless communication system according to claim 1, wherein the second wireless station is further configured to transmit a response signal within a specified time, the response signal indicating whether the data information is decoded successfully.

5. A wireless communication system in which a first wireless station transmits a radio signal including a plurality of radio frames sequentially to a second wireless station, at least one of the plurality of radio frames configured to include a control region and a data region, the control region including control information, the control information including information for coding associated data information, the wireless communication system comprising:

the first wireless station including a first memory and configured
to read region information from the first memory, the region information is included in a first radio frame of the radio signal transmitted by the first wireless station to the second wireless station, the first radio frame including region information defining a partition between a first region and a second region of at least a second radio frame of the plurality of radio frames, the first region and the second region included in the data region, the first region appearing earlier in time direction than the second region in the at least one of the plurality of radio frames, wherein the control information is mapped into the first region of the second radio frame when the control information and the data information corresponding to the control information are scheduled for transmission in the second radio frame of the plurality of radio frames, and wherein the control information is mapped into the second region of the second radio frame when the control information is scheduled for transmission in the second radio frame preceding a third radio frame of the plurality of radio frames that is subsequent to the second radio frame and that includes the data information corresponding to the control information,
to encode the data information corresponding to the control information in accordance with the control information, and
to transmit the second radio frame of the plurality of radio frames of the radio signal to the second wireless station, wherein the second radio frame includes the control information and the encoded data information corresponding to the control information when the control information is mapped within the first region of the second frame, and wherein the second radio frame includes the control information in the second region of the second radio frame transmitted prior to the third radio frame that includes the encoded data information corresponding to the control information that is mapped into the control information in the second region of the second radio frame; and the second wireless station including a second memory and configured
    to read the region information received in the first radio frame from the first wireless station from the second memory,
    to receive the second radio frame that includes the control information from the first wireless station,
    to determine whether the received control information is mapped within the first region of the second radio frame or in the second region of the second radio frame based on the received region information, and
    to decode the encoded data information received from the first wireless station in accordance with the received control information, the encoded data information being obtained from the received second radio frame that includes the received control information mapped within the first region of the second radio frame, and the encoded data information obtained from the third radio frame, which is received subsequent to the second radio frame that includes the received control information mapped in the second region of the second radio frame.

6. The wireless communication system according to claim 5, wherein the control information is E-PDCCH of an LTE system.

7. The wireless communication system according to claim 5, wherein the plurality of radio frames is a plurality of subframes of an LTE system.

8. The wireless communication system according to claim 5, wherein the second wireless station is further configured to transmit a response signal within a specified time, the response signal indicating whether the data information is decoded successfully.

9. A wireless communication system in which a first wireless station transmits a radio signal including a plurality of radio frames sequentially to a second wireless station, at least one of the plurality of radio frames configured to include a control region and a data region, the control region including control information, the control information including coding information for coding associated data information, the wireless communication system comprising:
    the first wireless station configured
        to encode the data information corresponding to the control information in accordance with the coding information, wherein the coding information is configured to indicate a size of the associated data information, and
        to transmit a first radio frame of the plurality of radio frames of the radio signal to the second wireless station in accordance with the size of the data information, wherein the first radio frame includes the encoded data information and the control information corresponding to the data information when the coding information indicates that the size of the data information is smaller than a threshold, and wherein the radio signal includes the control information in the first radio frame that is transmitted prior to a radio frame that includes the encoded data information corresponding to the control information when the size of the data information is larger than the threshold; and
    the second wireless station configured
        to receive the radio signal including the control information and the encoded data information corresponding to the control information from the first wireless station,
        to obtain the size of the data information corresponding to the received control information from the coding information included in the received control information, and
        to decode the encoded data information corresponding to the received control information from the first wireless station in accordance with both the coding information and the obtained size of the data information, the encoded data information being obtained from the received first radio frame of the plurality of radio frames that includes the received control information when the obtained size of the data information is smaller than the threshold, and the encoded data information obtained from the second radio frame, which is received subsequent to the first radio frame, that includes the received control information when the obtained size of the data information is larger than the threshold.

10. The wireless communication system according to claim 9, wherein the control information is E-PDCCH of an LTE system.

11. The wireless communication system according to claim 9, wherein the plurality of radio frames is a plurality of subframes of an LTE system.

12. The wireless communication system according to claim 9, wherein the second wireless station is further configured to transmit a response signal within a specified time, the response signal indicating whether the data information is decoded successfully.

* * * * *